United States Patent
Otsuka et al.

(10) Patent No.: US 9,540,491 B2
(45) Date of Patent: Jan. 10, 2017

(54) ORGANIC-INORGANIC COMPOSITE, COMPOSITION FOR FORMATION OF ORGANIC-INORGANIC COMPOSITE, AND INK

(75) Inventors: Takeshi Otsuka, Chiyoda-ku (JP); Yoshiki Chujo, Kyoto (JP)

(73) Assignees: SUMITOMO OSAKA CEMENT CO., LTD. (JP); KYOTO UNIVERSITY (JP)

(*) Notice: Subject to any disclaimer, the term of this patent is extended or adjusted under 35 U.S.C. 154(b) by 811 days.

(21) Appl. No.: 13/576,571

(22) PCT Filed: Jan. 27, 2011

(86) PCT No.: PCT/JP2011/051584
§ 371 (c)(1),
(2), (4) Date: Oct. 16, 2012

(87) PCT Pub. No.: WO2011/096321
PCT Pub. Date: Aug. 11, 2011

(65) Prior Publication Data
US 2013/0026416 A1    Jan. 31, 2013

(30) Foreign Application Priority Data

Feb. 3, 2010    (JP) .................................. 2010-022291

(51) Int. Cl.
*C09K 11/06* (2006.01)
*C09K 11/08* (2006.01)
(Continued)

(52) U.S. Cl.
CPC ........... *C08G 83/001* (2013.01); *C09D 11/037* (2013.01); *C09D 11/10* (2013.01)

(58) Field of Classification Search
CPC ....... C09K 11/02; C09K 11/025; C09K 11/06; C09K 11/07
(Continued)

(56) References Cited

U.S. PATENT DOCUMENTS

2004/0265253 A1    12/2004    Seo et al.
2010/0027192 A1*    2/2010    Perry et al. .................... 361/323

FOREIGN PATENT DOCUMENTS

EP    0706095 A1    4/1996
JP    A-61-167644    7/1986
(Continued)

OTHER PUBLICATIONS

Takayama et al. "Synthesis of Alq3-pendent Soluble Polymers and Their Applications to Organic Light Emitting Diode." *Koubunshi Ronbunshu*, 63(10):696-703 (2006). Abstract.
(Continued)

*Primary Examiner* — Matthew E Hoban
(74) *Attorney, Agent, or Firm* — Merchant & Gould P.C.

(57) ABSTRACT

An organic-inorganic composite of the present invention includes metal oxide particles and an organic polymer compound including a monomer containing organic ligands and a vinyl-based monomer having organic ligands which are bonded to a polymer chain through covalent bonds and the organic polymer compound is bonded to the metal oxide particles by the organic ligands forming a complex with metal atoms on the surface of the metal oxide particles. According to the organic-inorganic composite, the metal oxide particles and the organic polymer compound containing the organic ligands can be chemically bonded, therefore, light emission characteristics such as light emission intensity or stabilization of light emission wavelength can be improved, and transparency and mechanical characteristics such as thermal stability or hardness can also be improved.

10 Claims, 6 Drawing Sheets

(51) Int. Cl.
*C08G 83/00* (2006.01)
*C09D 11/037* (2014.01)
*C09D 11/10* (2014.01)

(58) Field of Classification Search
USPC .................................................. 252/301.36
See application file for complete search history.

(56) References Cited

FOREIGN PATENT DOCUMENTS

| JP | A-06-032824 | 2/1994 |
|---|---|---|
| JP | A-09-217038 | 8/1997 |
| JP | A-11-349875 | 12/1999 |
| JP | A-2000-254514 | 9/2000 |
| JP | A-2001-163617 | 6/2001 |
| JP | A-2004-300417 | 10/2004 |
| JP | A-2006-144002 | 6/2006 |
| JP | A-2006-321910 | 11/2006 |
| WO | WO 02/058928 A1 | 8/2002 |
| WO | WO 2004/081072 A2 | 9/2004 |
| WO | WO 2004/085543 A1 | 10/2004 |
| WO | WO 2006/004187 A1 | 1/2006 |

OTHER PUBLICATIONS

Ivanovici et al. "Atom Transfer Radical Polymerizations of Complexes Based on Ti and Zr Alkoxides Modified with β-Keto Ester Ligands and Transformation of the Resulting Polymers in Nanocomposits." *Macromolecules*, 41(4):1131-1139 (2008).

Otsuka et al. "Highly stabilized luminescent polymer nanocomposites: fluorescence emission from metal quinolate complexes with inorganic nanocrystals." *J. of Materials Chemistry*, 20(47): 10688-10695 (Dec. 21, 2010).

International Search Report for International Application No. PCT/JP2011/051584 (mailed Apr. 12,2011).

Takayama et al. "Synthesis of Alq3-pendent Soluble Polymers and Their Application to Organic Light Emitting Diode," *Koubunshi Ronbunshu*. 63(10):696-703 (2006). Abstract.

Ivanovici et al. "Atom Transfer Radical Polymerizations of Complexes Based on Ti and Zr Alkoxides Modified with β-Keto Ester Ligands and Transformation of the Resulting Polymers in Nanocomposites," *Macromolecules*, 41(4):1131-1139 (2008).

European Search Report for EP Application No. 11739670.5 dated May 31, 2013, 8 pages.

\* cited by examiner (A)  (B)

ORGANIC-INORGANIC COMPOSITE, COMPOSITION FOR FORMATION OF ORGANIC-INORGANIC COMPOSITE, AND INK

This application is a U.S. National Stage Application under 35 U.S.C. §371 of International Patent Application No. PCT/JP2011/05184, filed 27 Jan. 2011, which claims the benefit of priority to Japanese Patent Application No. 2010-022291 filed 3 Feb. 2012, the disclosures of all of which are hereby incorporated by reference in their entireties. The International Application was published in Japanese on 11 Aug. 2011, as WO 2011/096321.

TECHNICAL FIELD

The present invention relates to an organic-inorganic composite, a composition for formation of an organic-inorganic composite, and an ink, and, in more detail, an organic-inorganic composite in which mechanical characteristics such as thermal stability or hardness is improved while light emission characteristics and transparency are maintained by a complex being formed with metal atoms on the surface of metal oxide particles, a composition for formation of an organic-inorganic composite suitable for use in preparing this organic-inorganic composite, and an ink which contains this composition for formation of an organic-inorganic composite.

BACKGROUND

In recent years, light emitting devices or displays using light emitting elements made of organic materials have been actively developed. Among these, organic electroluminescence (EL) devices, in which a light emitting layer made of an organic thin film, a hole transport layer and an electron transport layer are stacked, are promising displays in terms that they are self-light-emitting devices of carrier injection type and brightness can be obtained as well.

As electron transporting materials or light emitting materials used for these organic EL devices, metal complexes having organic ligands (hereinafter, abbreviated to organometallic complexes) are used and, for example, tris(8-hydroxyquinolinato)aluminum ($Alq_3$), which is an alumiquinolinium complex, can be used in an organic EL element preparation by being vacuum deposited between a hole transport layer and a cathode made of aluminum, and is used as a material having an excellent electron transporting property and a light emitting property.

As film formation methods of the organometallic complexes, a dry process by vacuum deposition is currently the mainstream method, however, a wet process using polymer materials has also been studied from the viewpoint of convenience of preparation process and the fact that can produce a film having a larger area (for example, see Non-Patent Document No. 1).

In addition, various proposals regarding organic-inorganic hybrid materials in which an organic light emitting material is protected by an inorganic oxide such as silica have been made from the viewpoint of stability of organic EL characteristics.

As the organic-inorganic hybrid material, a light emitting hybrid material has been obtained at a relatively low temperature when synthesized by a sol-gel method (for example, see Patent Document No. 1).

In addition, as the organic-inorganic hybrid material, a white light emitting material in which a π-conjugated polymer is homogeneously dispersed in an inorganic matrix, therefore, having excellent weathering resistance has been proposed (For example, see Patent Document No. 2).

By using metal oxides instead of inorganic oxides such as silica, an organic-inorganic hybrid material including an organic ligand which is difficult to prepare using conventional sol-gel methods has also been proposed (For example, see Patent Document No. 3).

On the other hand, when focusing on light emitting inorganic materials, oxides containing rare earth elements are known as fluorescent materials, and preparing an inorganic-organic polymer composite by forming these fluorescent materials as particles and introducing the particulate to organic polymers has been proposed (For example, see Patent Document No. 4).

Also, an organic-inorganic hybrid material in which a light emitting property is applied by introducing rare earth elements into glasses with low-melting points has been proposed (for example, see Patent Document No. 5).

As described above, studies of various light emitting materials regardless of organic materials or inorganic materials have been made, and, in particular, various proposals have also been made since light emitting hybrid materials having both light emission characteristics and weathering resistance due to combination of organic materials and inorganic materials have been studied.

PRIOR DOCUMENTS

Patent Document

[Patent Document No. 1] Japanese Unexamined Patent Application, First Publication No. 2006-144002
[Patent Document No. 2] Japanese Unexamined Patent Application, First Publication No. 2006-321910
[Patent Document No. 3] International publication pamphlet WO 2004/085543
[Patent Document No. 4] International publication pamphlet WO 2006/004187
[Patent Document No. 5] Japanese Unexamined Patent Application, First Publication No. 2004-300417

Non Patent Document

[Non-Patent Document No. 1] Toshio TAKAYAMA, Masatoshi KITAMURA, Yasushi KOBAYASHI, Yasuhiko ARAKAWA, Kazuaki KUDO, "Synthesis of $Alq_3$-pendent soluble polymers and their application to organic light emitting diode", Polymer Proceedings, The Society of Polymer Science, published in October 2006, Vol. 63, No. 10, page 696 to page 703.

SUMMARY OF INVENTION

Technical Problem

However, in light emitting materials using conventional polymer materials, there are problems of insufficient thermal stability even when polymerization is carried out since the material itself is an organic material. Furthermore, in an organic-inorganic hybrid material in which a π-conjugated polymer is homogeneously dispersed in an inorganic matrix, it is difficult to obtain a high molecular weight product of the π-conjugated polymer and a film-forming property is also poor since the π-conjugated polymer itself has a very rigid molecular structure.

In addition, in an organometallic complex in which a metal complex is formed in a polymer side chain, there have been concerns that a metal alkoxide is used when a metal element is introduced, therefore, this metal alkoxide is degraded due to moisture in the atmosphere and it is difficult to carry out a simple treatment.

Also, in the organic-inorganic hybrid material having a light emitting property, this organic-inorganic hybrid material itself has no flexibility since inorganic components are intrinsically networked and are in a solid state, therefore, there have been problems such that obtaining a flexible film is difficult.

In addition, in an organic-inorganic hybrid material in which a π-conjugated polymer is homogeneously dispersed in an inorganic matrix, it is difficult to homogeneously disperse the π-conjugated polymer in the inorganic matrix, therefore, there have been problems such that synthesis of the organic-inorganic hybrid material becomes very complicated and manufacturing costs are increased.

On the other hand, in organic-inorganic hybrid materials which include organic ligands, the organic ligands are stabilized by inorganic components, however, problems such as discoloration due to degradation of the organic ligands occur in some cases since organic components and inorganic components are not chemically bonded.

Also, in the organic-inorganic hybrid glass material using glasses with low melting points, there have been problems such that glasses with low melting points lack processibility, and processing and film formation are extremely difficult to perform at approximately room temperature to 100° C.

In addition, in a method in which an inorganic-organic polymer composite is prepared by forming fluorescent materials as particles made of inorganic oxides and introducing the particulate materials to organic polymers, chemical bonding between inorganic materials and organic polymers is not intrinsically formed, therefore, the fluorescent materials may not be homogeneously dispersed into the organic polymers which become a matrix, and there have been concerns such that the fluorescent materials can be aggregated.

On the other hand, ink containing fluorescent materials is used as ink for printing or ink for an ink jet, however, when organometallic complexes are used as light emitting materials, there have been problems such that suppressing degradation is difficult due to a lack of durability and concentration quenching occurs due to an aggregation of the organometallic complexes.

Furthermore, when fluorescent materials made of inorganic oxides are used as light emitting materials, there have been concerns that stability of the ink is impaired due to aggregation of inorganic oxides owing to poor dispersion.

The present invention has been made in view of the above described problems and an object of the present invention is to provide an organic-inorganic composite having excellent light emission characteristics and transparency and also having excellent thermal stability and mechanical characteristics such as hardness by forming a complex with metal atoms on the surface of metal oxide particles, a composition for formation of an organic-inorganic composite used in forming this organic-inorganic composite, and an ink which contains this composition for formation of an organic-inorganic composite.

Solution to Problem

The inventors, after repeated intensive studies on composites with metal oxide particles and organic polymer compounds having organic ligands, have found that metal oxide particles can be chemically bonded to an organic polymer compound containing organic ligands when a complex is formed from the organic ligands of the organic polymer compound and a metal atom on the surface of the metal oxide and a light emission site is formed, therefore, light emission characteristics such as light emission intensity or stabilization of light emission wavelength can be improved, and transparency, thermal stability, and mechanical characteristics such as hardness can also be improved, and completed the present invention based on these findings.

That is, the organic-inorganic composite of the present invention includes metal oxide particles and an organic polymer compound containing organic ligands which are bonded to a polymer chain through covalent bonds, wherein the organic polymer compound is bonded to the metal oxide particles by the organic ligands forming a complex with metal atoms on the surface of the metal oxide particles.

In the organic-inorganic composite of the present invention, it is preferable that light be emitted by being irradiated with excitation light.

It is preferable that the organic polymer compound form an inorganic dispersed phase which is crosslinked by the metal oxide particles.

It is preferable that the complex formed from the organic ligands and the metal atoms be a light emission site which generates the light emission.

It is preferable that the metal oxide particles contain one or, two or more elements selected from the group consisting of magnesium oxide, calcium oxide, strontium oxide, barium oxide, scandium oxide, yttrium oxide, lanthanum oxide, titanium oxide, zirconium oxide, hafnium oxide, zinc oxide, aluminum oxide, gallium oxide, indium oxide, iron oxide, copper oxide, niobium oxide, tungsten oxide, lead oxide, bismuth oxide, cerium oxide, and antimony oxide.

It is preferable that the organic ligand include a cyclic structure having a conjugated system or a plurality of unsaturated bonds, and also include an element having a lone pair of electrons and a hydroxyl group in the same ligand, and the lone pair of electrons and an oxygen atom of the hydroxyl group are coordinated to the same metal atom and form a cyclic complex.

It is preferable that the organic polymer compound be a copolymer of an organic ligand-containing monomer including an unsaturated group and the organic ligand which is capable of forming coordinate bonds to the metal atoms within the molecule and a vinyl-based monomer.

A composition for formation of an organic-inorganic composite of the present invention includes metal oxide particles, an organic polymer compound containing organic ligands which are bonded to a polymer chain through covalent bonds and are capable of forming coordinate bonds to metal atoms on the surface of the metal oxide particles, or a monomer or an oligomer for forming the organic polymer compound containing the organic ligands.

It is preferable that the composition for formation of an organic-inorganic composite of the present invention include an organic solvent.

It is preferable that the light emission of the organic-inorganic composite of the present invention be any one of blue light emission, green light emission, yellow light emission, and red light emission.

An ink of the present invention includes metal oxide particles, an organic polymer compound containing organic ligands which are bonded to a polymer chain through covalent bonds and are capable of forming coordinate bonds to metal atoms on the surface of the metal oxide particles, or a monomer or an oligomer for forming the organic polymer compound containing the organic ligands, and an organic solvent.

Advantageous Effects of Invention

According to the organic-inorganic composite of the present invention, metal oxide particles and an organic polymer compound containing organic ligands which are bonded to a polymer chain through covalent bonds are included, the metal oxide particles and the organic polymer compound containing the organic ligands can be chemically bonded since the organic ligands of the organic polymer compound form a complex with metal atoms on the surface of the metal oxide particles, along with forming a light emission site, and as a result, light emission characteristics such as light emission intensity or stabilization of light emission wavelength can be improved and a composite having satisfactory optical characteristics can be provided.

Discoloration due to degradation of the organic ligands can also be reduced as well as light emission characteristics being improved by stabilization of the organic ligands since the organic ligands of the organic polymer compound are bonded to the polymer chain through covalent bonds and these organic ligands are bonded to the metal oxide particles by forming a complex with the metal atoms on the surface of the metal oxide particles.

In addition, an inorganic dispersed phase is formed by using the metal oxide particles, and homogeneously dispersing the metal oxide particles in the organic polymer compound, therefore, mechanical properties such hardness or strength are improved compared to those of the organic polymer compound alone, along with homogeneity, high transparency and excellent light emission characteristics being obtained. A flexible or a film-shaped organic-inorganic composite is also easily obtained from maintaining flexability and moldability of the organic polymer compound.

In addition, there are no concerns of a complicated manufacturing process and a high manufacturing cost since this organic polymer compound is not a π-conjugated polymer.

The composition for formation of an organic-inorganic composite of the present embodiment includes metal oxide particles, an organic polymer compound containing organic ligands which are bonded to a polymer chain through covalent bonds and are capable of forming coordinate bonds to metal atoms on the surface of the metal oxide particles, or a monomer or an oligomer in order to form the organic polymer compound containing the organic ligands, and therefore, the metal oxide particles can be homogeneously dispersed and dissolved in the organic polymer compound. As a result, light emission characteristics and transparency of the organic-inorganic composite obtained from this composition for formation of an organic-inorganic composite can be improved.

Also, when the organic compound is included, the organic-inorganic composite can be easily prepared with a treatment at a low temperature of approximately room temperature to 150° C., using a wet process in which this organic solvent is volatilized and removed.

Heat treatment can also be carried out on this organic polymer compound under a normal atmosphere since a metal alkoxide used in conventional metal complex syntheses is not included. Therefore, the organic-inorganic composite of the present invention can be easily prepared using this composition for formation of an organic-inorganic composite and common simple manufacturing devices.

The ink of the present invention is an ink which includes metal oxide particles, an organic polymer compound containing organic ligands which are bonded to a polymer chain through covalent bonds and are capable of forming coordinate bonds to metal atoms on the surface of the metal oxide particles, or a monomer or an oligomer for forming the organic polymer compound containing the organic ligands, and an organic solvent, therefore, light emission characteristics and transparency can be improved, and, as a result, the organic-inorganic composite in a target shape can be easily prepared by printing this ink using a printing machine, or patterning or molding by discharging using an ink jet, along with suppressing the concentration quenching due to aggregation of the organic ligands.

Furthermore, homogeneous ink having satisfactory optical characteristics can be formed along with securing the dispersion of the metal oxide particles since the metal oxide particles are bonded to the polymer chain through covalent bonds. As a result, stabilization of light emission can be achieved.

DETAILED DESCRIPTION

Embodiments of the organic-inorganic composite, the composition for formation of an organic-inorganic composite, and the ink of the present invention will be described.

These embodiments are for specific description in order to enlighten the object of the invention better, and are not for limitation of the present invention unless otherwise mentioned.

"Organic-Inorganic Composite"

Figure 1:
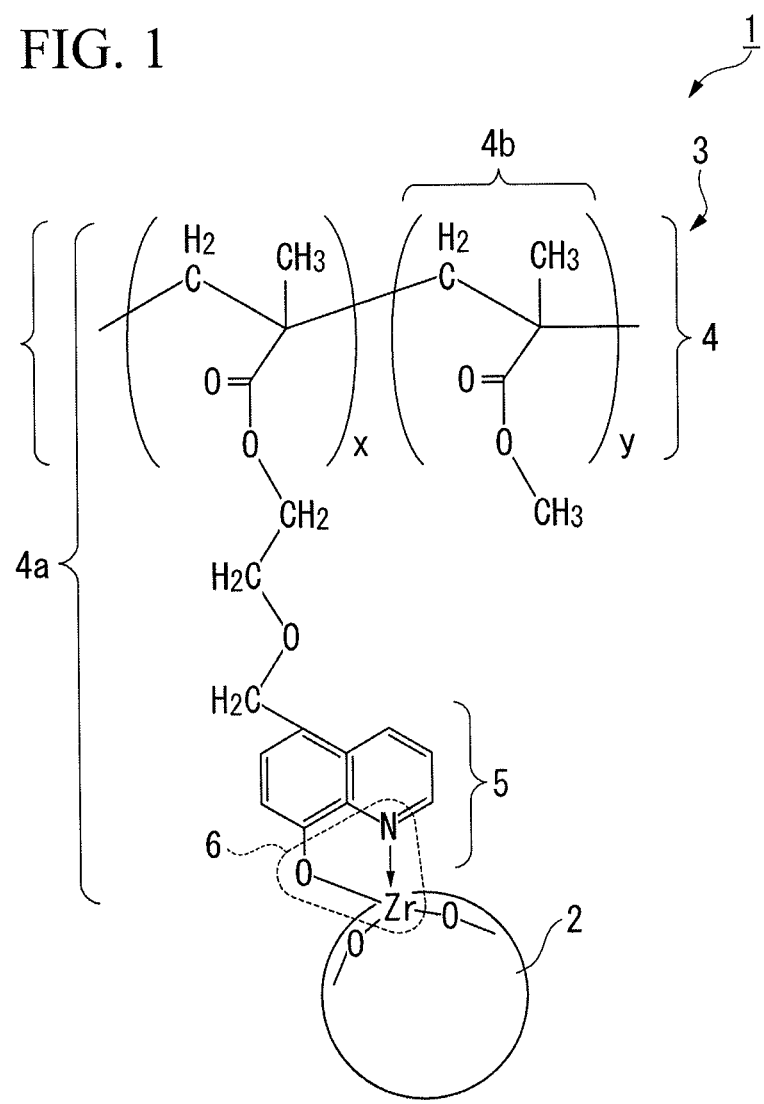
FIG. 1 is a schematic diagram which shows an example in which 8-quinolinol is used as an organic ligand of an organic-inorganic composite according to one embodiment of the present invention.

FIG. 1 to FIG. 4 are schematic diagrams which show examples of the organic-inorganic composite according to one embodiment of the present invention, and in FIG. 1, a case in which zirconium oxide particles are used as the metal oxide particles, 8-quinolinol is used as the organic ligand, and polymethyl methacrylate copolymer is used as the organic polymer compound is exemplified.

Figure 2:
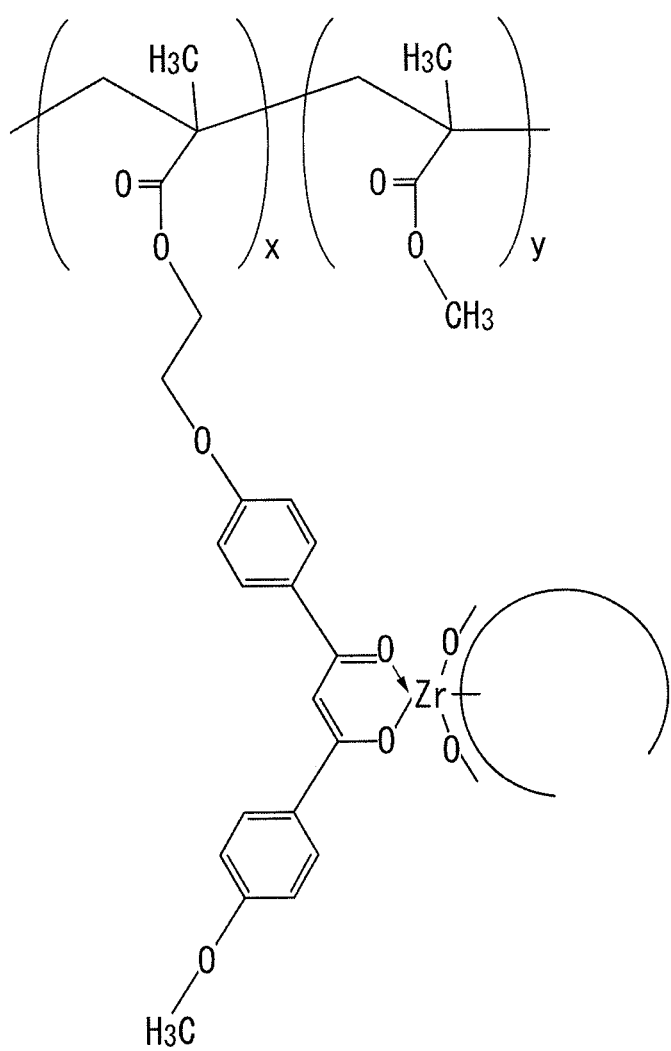
FIG. 2 is a schematic diagram which shows an example in which methoxyphenyl propanedione is used as an organic ligand of an organic-inorganic composite according to one embodiment of the present invention.

In FIG. 2, a case in which zirconium oxide particles are used as the metal oxide particles, methoxyphenyl propanedione is used as the organic ligand, and polymethyl methacrylate copolymer is used as the organic polymer compound is exemplified.

Figure 3:
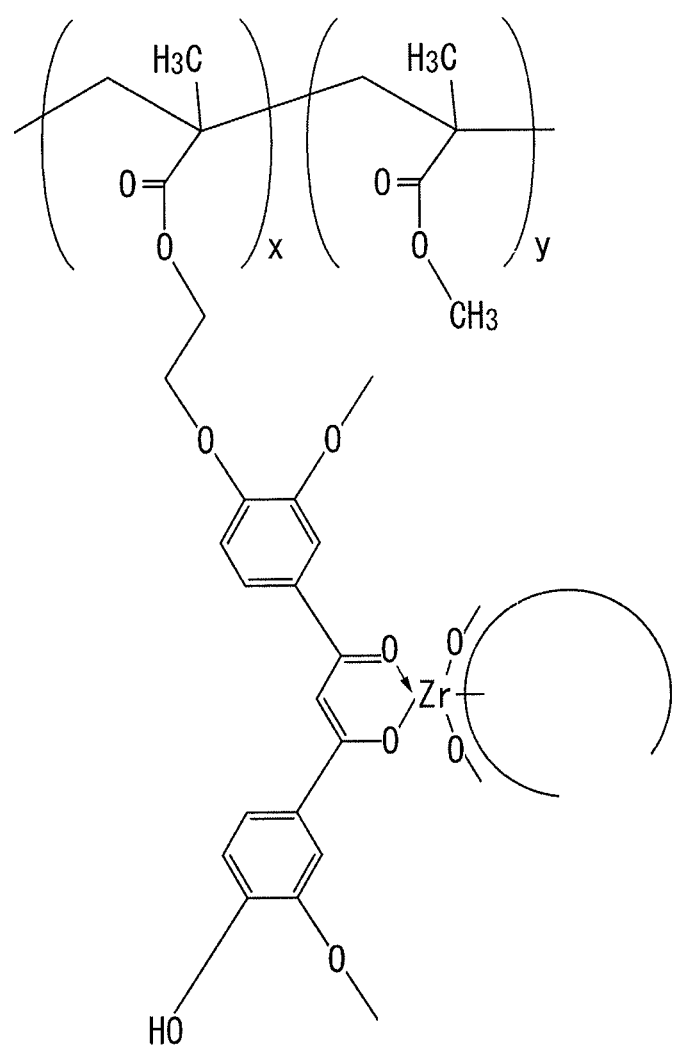
FIG. 3 is a schematic diagram which shows an example in which curcumin is used as an organic ligand of an organic-inorganic composite according to one embodiment of the present invention.

In FIG. 3, a case in which zirconium oxide particles are used as the metal oxide particles, curcumin is used as the organic ligand, and polymethyl methacrylate copolymer is used as the organic polymer compound is exemplified.

Figure 4:
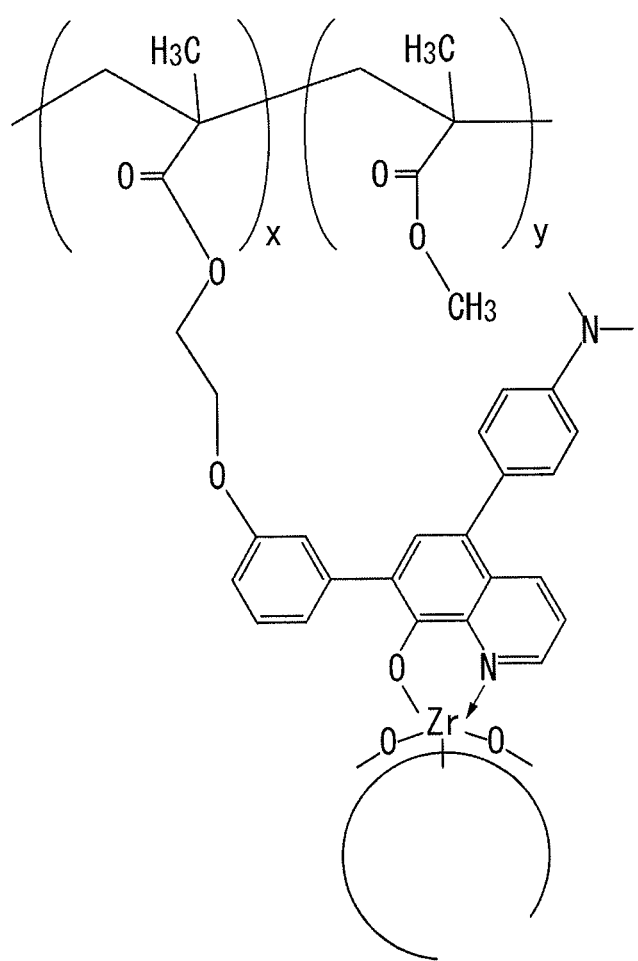
FIG. 4 is a schematic diagram which shows an example in which quinolinol containing a dimethylamino group is used as an organic ligand of an organic-inorganic composite according to one embodiment of the present invention.

In FIG. 4, a case in which zirconium oxide particles are used as the metal oxide particles, quinolinol containing a dimethylamino group is used as the organic ligand, and polymethyl methacrylate copolymer is used as the organic polymer compound is exemplified.

In these organic-inorganic composite, a case is exemplified in which zirconium oxide particles are used as the metal oxide particles, any one of 8-quinolinol, methoxyphenyl propanedione, curcumin, and quinolinol containing a dimethylamino group is used as the organic ligand, and polymethyl methacrylate copolymer is used as the organic polymer compound, respectively, however, the principle is the same even when metal oxide particles other than zirconium oxide particles are used, organic ligands other than those described above are used, or organic polymer compounds other than polymethyl methacrylate copolymer are used.

The organic-inorganic composite in the present embodiment will be described in detail.

Here, the organic-inorganic composite shown in FIG. 1 is described as an example, however, even for the organic-inorganic composite shown in FIG. 2 to FIG. 4, the same actions and effects of the organic-inorganic composite shown in FIG. 1 are exhibited.

This organic-inorganic composite 1 is composed of the metal oxide particle 2 and the organic polymer compound 3, the organic ligand 5 is bonded to the polymer chain 4 of the organic polymer compound 3 through covalent bonds, this organic ligand 5 forms a light emission site by forming the complex 6 with the metal atoms on the surface of the metal oxide particle 2, and is bonded to the metal oxide particle 2 and becomes a composite. Here, it is preferable that the polymer chain 4 include a copolymer of the part having the organic ligand-containing monomer as the structural unit 4a and the part having the vinyl-based monomer as the structural unit 4b.

In this organic-inorganic composite 1, the organic ligand 5 is not in a state of being an isolated ligand, that is, a ligand which is not polymerized, but is bonded to the polymer chain 4 through covalent bonds, and also, is strongly bonded to the metal atoms on the surface of the metal oxide particle 2 through coordinate bonds and forms the complex 6. Therefore, the polymer chain 4, the organic ligand 5, and the metal oxide particle 2 are bonded to each other and unified. As a result, this organic-inorganic composite 1 has the following effects.

First of all, high efficiency of light emission and stabilization of light emission characteristics can be obtained. The reason is as follows.

Generally, a skeleton in an organic molecule (including a carbon skeleton and a skeleton with a heteroatom present in the skeleton) easily deform a skeleton (thermal vibrational motion) by energy application from outside since a high three-dimensional degree of freedom is high. Similarly, in the complex formed from the organic ligands, the skeleton of the organic ligand easily deforms and the whole complex is also easily deformed since the coordinate bond has little effect in suppressing this deformation.

Here, when the complex becomes the light emission site, in order to emit light, it is necessary to generate a transition of the energy levels of the electrons within the complex or a charge transfer transition (hereinafter, referred to as a transition for light emission) by an energy application from outside. However, if the complex is easily deformed, it is difficult to generate a transition for light emission since most of the energy applied from outside is used for complex deformation (thermal vibrational motion). As a result, problems such as unstable light emission, decreased light emitting efficiency, and changes in absorption wavelength or light emission wavelength arise.

Even in the complex 6 of the present embodiment, in a case in which the organic ligand 5 is present alone, deformation may also similarly occur, however, in the organic-inorganic composite 1 of the present embodiment, the polymer chain 4, the organic ligand 5, and the metal oxide particle 2 are bonded to each other and unified, and both sides of the complex 6, which is the light emission site, are sandwiched between the massive polymer chain 4 and the metal oxide particle 2, and therefore the degree of freedom of deformation is significantly reduced and the complex is stabilized by being fixing to a specific three-dimensional shape. By the shape of the complex 6 being stabilized as described above, energy applied to the complex 6 from outside is barely consumed in deformation of the complex and is used in transition for light emission, therefore, reduction of light emission efficiency can be prevented. Fluctuations of absorption wavelength or instability of light emission can also be avoided by absorption wavelength or light emission wavelength becoming constant since the three-dimensional shape is fixed.

In the organic-inorganic composite 1, the organic ligand 5 in the polymer chain 4 serving as a matrix component or the metal oxide particle 2 which is an inorganic component is homogeneously and stably dispersed without occurring phase separation from the polymer chain 4 or aggregation.

The reason could be that the organic ligand 5 and the metal oxide particle 2 do not cause separation or aggregation with regard to the polymer chain 4 since the polymer chain 4, the organic ligand 5, and the metal oxide particle 2 are bonded to each other and unified.

Consequently, durability can also be improved since separation between the organic phase and inorganic phase or decomposition can be prevented since no phase separation or aggregation occurs, and therefore, degradation over time can be suppressed.

As described, in the organic-inorganic composite 1 of the present embodiment, the organic ligand 5 introduced to the organic polymer compound 3 becomes a composite with the metal oxide particle 2 as it forms the complex 6 with the metal atoms on the surface of the metal oxide particle 2, therefore, the organic ligand 5 is stabilized by the polymer chain 4 and the metal oxide particle 2, and as a result, light emission characteristics or durability can be improved.

Figure 5:
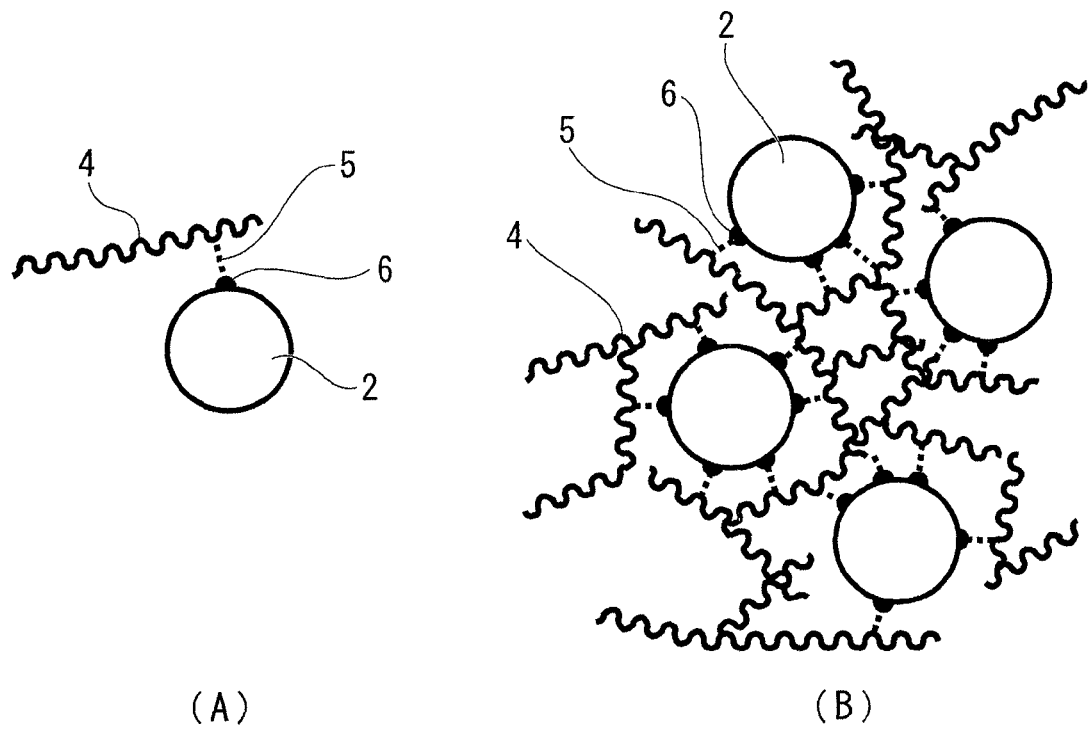
FIG. 5 is a schematic diagram which shows a structure of an organic-inorganic composite according to one embodiment of the present invention, and in the drawing, (A) is a diagram which shows a basic structure, and (B) is a diagram which shows a state in which polymer chains are crosslinked by metal oxide particles.

FIG. 5 is a schematic diagram which shows a structure of an organic-inorganic composite 1, and in the drawing, (A) is a diagram which shows a basic structure, and (B) is a diagram which shows a state in which the polymer chain 4 is crosslinked by metal oxide particles 2.

FIG. 5(A) schematically shows the basic structure of the present embodiment shown in FIGS. 1 to 4, and shows that the polymer chain 4, the organic ligand 5, and the metal oxide particle 2 are bonded to each other and unified, and both sides of the complex 6, which is the light emission site, are sandwiched between the massive polymer chain 4 and the metal oxide particle 2, therefore the degree of freedom of deformation is significantly reduced and the complex is stabilized by being fixed to a specific three-dimensional shape.

FIG. 5(B) shows a composite state in the organic-inorganic composite 1 of this embodiment, and a plurality of the organic ligands 5 are introduced to the polymer chain 4, and these organic ligands 5 and the metal atoms on the surface of the metal oxide particles 2 form the complex 6, and as a result, a plurality of polymer chains 4 are bonded to each other through the metal oxide particles 2, and as a whole, the organic-inorganic composite 1 includes a plurality of cross linking structures. Therefore, reduction of light emission efficiency, fluctuations of absorption wavelength or instability of light emission can also be suppressed since the shape of the complex 6 is more stabilized and the three-dimensional shape is also fixed. In addition, the whole organic-inorganic composite 1 experiences an interaction by strong bonding, therefore, mechanical characteristics such as thermal stability or hardness can also be improved along with forming a stable inorganic dispersed phase.

Figure 6:
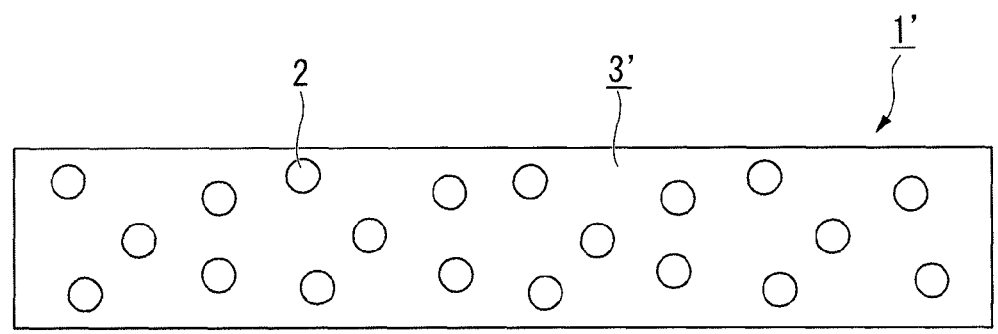
FIG. 6 is a schematic diagram which shows an organic-inorganic composite in which metal oxide particles according to one embodiment of the present invention are homogeneously dispersed in a bulk-form organic polymer compound.

FIG. 6 is a schematic diagram which shows an organic-inorganic composite 1' in which metal oxide particles 2 are homogeneously dispersed in a bulk-shaped organic polymer compound 3' which is a cured organic polymer compound 3.

The organic-inorganic composites 1 and 1' of the present embodiment have a firm structure since the polymer chain 4 or the organic ligand 5 which composes the organic polymer compounds 3 and 3' is chemically bonded to the metal oxide particles 2, and therefore, the metal oxide particles 2 can be introduced to the bulk-shaped organic polymer compound 3' without impairing dispersibility. Therefore, homogeneous organic-inorganic composites 1 and 1' which maintain transparency can be obtained.

Next, components and the like of the organic-inorganic composite of the present embodiment will be described in detail.

The metal oxide particles are particles of which a component is either metal oxide or metal oxide composite. Examples of the metal oxide include one or, two or more elements selected from the group consisting of magnesium oxide, calcium oxide, strontium oxide, barium oxide, scandium oxide, yttrium oxide, lanthanum oxide, titanium oxide, zirconium oxide, hafnium oxide, zinc oxide, aluminum oxide, gallium oxide, indium oxide, iron oxide, copper oxide, niobium oxide, tungsten oxide, lead oxide, bismuth oxide, cerium oxide, and antimony oxide.

As the metal oxide composite, one or, two or more elements selected from the group consisting of ATO (antimony-doped tin oxide), ITO (indium tin oxide), IZO (indium zinc oxide), AZO (aluminum-doped zinc oxide), and GZO (gallium-doped zinc oxide) can be included.

An average particle diameter of the metal oxide particles is preferably 1 nm or more and 100 nm or less, more preferably 2 nm or more and 50 nm or less.

Here, the reason to limit the average particle diameter of this metal oxide particle to 1 nm or more and 100 nm or less is that, if the average particle diameter is less than 1 nm, a structure of the metal oxide particle becomes unstable since the particle diameter is too small, and as a result, it is difficult to obtain satisfactory organic-inorganic composites due to not only a possibility of light emission characteristics being changed in the organic-inorganic composite, but also poor dispersion in an organic solvent. If the average particle diameter of this metal oxide particle exceeds 100 nm, light scattering is generated since the metal oxide particle diameter is too large, and as a result, light transmission is reduced and light emission intensity is reduced.

The content of the metal oxide particles in this organic-inorganic composite is preferably 1% by mass or more and 50% by mass or less, more preferably 5% by mass or more and 20% by mass or less.

Here, the reason to limit the content of the metal oxide particles to 1% by mass or more and 50% by mass or less is that metal oxide particles are in a satisfactory state of dispersion in this range, and when the content of the metal oxide particles is less than 1% by mass, light emission characteristics of the organic-inorganic composite is reduced, and when the content of the metal oxide particles exceeds 50% by mass, characteristics as homogeneous organic-inorganic composite are lost due to gelation or aggregated precipitation, and therefore, it is not preferable.

Meanwhile, as the organic polymer compound containing the organic ligands which are bonded to the polymer chain through covalent bonds, a copolymer of an organic ligand-containing monomer including an unsaturated group and the organic ligand which is capable of forming coordinate bonds to the metal atoms within the molecule with a vinyl-based monomer is preferable.

It is preferable that this organic ligand be capable of forming a cyclic complex by including a cyclic structure having a conjugated system or a plurality of unsaturated bonds, also including an element having a lone pair of electrons and a hydroxyl group in the same ligand, and coordinating the lone pair of electrons and an oxygen atom of the hydroxyl group to the same metal atom. Here, the element having a lone pair of electrons is not particularly limited, however, nitrogen, oxygen, sulfur, or the like which are generally possible to be included in organic compounds are preferable. This element having a lone pair of electrons may form a heterocyclic ring by a heteroatom being present in the cyclic structure, or may be present in the vicinity of the cyclic structure outside the cyclic structure such as an oxygen atom of the carbonyl group bonded to the cyclic structure.

As the organic ligand, specifically, any of (1) an organic compound capable of forming a complex with a phenolic hydroxyl group and a heterocyclic ring of which a nitrogen atom is a heteroatom, (2) an organic compound capable of forming a complex with a phenolic hydroxyl group and a carbonyl group, and (3) an organic compound capable of forming a complex with a β-diketone structure is preferable.

Here, examples of the (1) the organic compound capable of forming a complex with a phenolic hydroxyl group and a heterocyclic ring of which a nitrogen atom include a heteroatom, 8-hydroxyquinoline and derivatives thereof. Example of other organic compounds (I) include 10-hydroxybenzo[h]-quinoline, 2-(2-hydroxyphenyl)benzoxazole, 2-(2-hydroxyphenyl)benzothiazole, 2-(2-hydroxyphenyl)benzimidazole derivatives, 2-(2-hydroxyphenyl)pyridine and derivatives thereof or the like. Compounds such as quinoxaline-based, phenazine-based, or naphthyridine-based compounds can also be applied.

Also, examples of (2) the organic compound capable of forming a complex with a phenolic hydroxyl group and a carbonyl group include 3-hydroxyflavone, 5-hydroxyflavone. Compounds such as acetophenone-based compounds, benzophenone-based compounds or the like can also be used.

In addition, examples of (3) the organic compound capable of forming a complex with a β-diketone structure include 1,3-diphenyl-1,3-propanedione, 1,3-bis(4-methoxyphenyl)-1,3-propanedione.

Also, the structure of a β-diketone is represented by following Formula (1),

$$R_1-CO-CH_2-CO-R_2 \quad (1)$$

and it does not seem to have a hydroxyl group, however, in fact, the structure is constantly changing (vibrating) within the molecule as shown in the following chemical formula, and a hydroxyl group and an oxygen atom having a lone pair of electrons are present in the structure.

[Chem. 1]

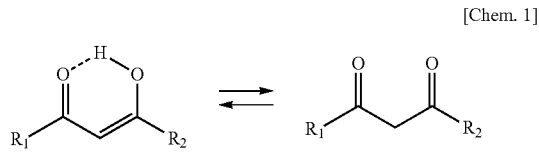

It is preferable that, in the organic-inorganic composite of the present embodiment, the electrons in the lone pair of electrons in the organic ligand and the oxygen atom of the hydroxyl group be coordinated to the same metal atom in the metal oxide particles and form a cyclic complex. The reason is considered as follows.

Several types of complexes are known to emit light by generating a charge-transfer transition (CT transition) involving the movement of electrons between different atoms. In the cyclic complex structure including the organic ligand of the present embodiment, it is easy to transfer electrons from the organic ligand to the central metal since this organic ligand has a cyclic structure having a conjugated system or a plurality of unsaturated bonds, and therefore, this cyclic structural unit becomes an electron-rich site.

In the complex of the present embodiment, it is believed that light is emitted by generating a LMCT (Ligand to Metal Charge Transfer) transition which is a transition process in which the electrons are transferred from the organic ligand to the central metal due to absorption of energy such as light from outside. The cyclic complex has a suitable structure to generate light emission by a LMCT transition.

As energy from outside, thermal energy, electrical energy or the like in addition to light energy can be selected, however, it is preferable that light be emitted by applying light energy, that is, irradiating excitation light.

In addition, a light emission wavelength can be controlled by selecting structures and components of these organic ligands, the metal element coordinated in the metal oxide, and the structure of the complex itself.

This light emission wavelength is not particularly limited, however, having light emission spectrum peaks in the wavelength region ranging from 380 nm to 750 nm is preferable in order to emit light in the visible light region.

In particular, in order to obtain blue light emission, a metal oxide, a structure of an organic ligand and the like having a maximum light emission wavelength in the wavelength region ranging from 430 nm to 480 nm may be selected.

Furthermore, in order to obtain green light emission, a metal oxide, a structure of an organic ligand and the like having a maximum light emission wavelength in the wavelength region ranging from 500 nm to 560 nm may be selected.

Furthermore, in order to obtain yellow light emission, a metal oxide, a structure of an organic ligand and the like having a maximum light emission wavelength in the wavelength region ranging from 575 nm to 595 nm be selected.

Furthermore, in order to obtain red light emission, a metal oxide, a structure of an organic ligand and the like having a maximum light emission wavelength in the wavelength region ranging from 610 nm to 750 nm may be selected.

Therefore, an organic-inorganic composite which can emit light in any one of blue light emission, green light emission, yellow light emission, and red light emission can be obtained by selecting a metal oxide and a structure of an organic ligand.

It is preferable that this organic ligand have a three-dimensional structure so as not to disturb the complex forming site, bond to a monomer having a polymerizable unsaturated group through covalent bonds, and form an organic ligand-containing monomer. For example, it is possible to synthesize the organic ligand-containing monomer by introducing an alkyl group to the organic ligand and bonding the alkyl group to a monomer having a polymerizable unsaturated group through an ether bond or an ester bond using organic chemical method.

The organic ligand is stabilized by bonding to the monomer having the polymerizable unsaturated group through covalent bonds, therefore, degradation of the organic ligand can be suppressed as well as light emission characteristics being improved. In addition, the organic ligand and the monomer having the polymerizable unsaturated group are not particularly limited as long as they form covalent bonds.

Here, the organic ligand-containing monomer having the polymerizable unsaturated group to which the organic ligand is bonded through covalent bonds is a monomer having a polymerizable unsaturated group such as an acryloyl group, a methacryloyl group, a vinyl group, a styryl group or the like, and is appropriately selected for compatibility with the metal oxide particles. The monomer having the polymerizable unsaturated group may be used either alone or as a combination of two or more.

Next, the vinyl-based monomer which forms the polymer chain 4 by copolymerizing with the organic ligand-containing monomer will be described.

The vinyl-based monomer is a monomer having a polymerizable unsaturated group. Examples of the vinyl-based monomer include a (meth)acryl-based monomer which contains an acryloyl group or a methacryloyl group within the molecule, a styrene-based monomer, a vinyl chloride-based monomer, an acrylamide-based monomer, a vinyl acetate-based monomer, a diene-based monomer such as butadiene or isoprene.

In particular, since it has an excellent transparency, a (meth)acryl-based monomer is suitable for the organic-inorganic composite which requires light emission characteristics and transparency, and a monofunctional (meth)acrylic monomer is particularly preferable. A polyfunctional (meth)acrylic monomer may also be used as necessary. This (meth)acryl-based monomer may be used either alone or as a combination of two or more.

Specific examples of the monofunctional (meth)acrylic monomer and the polyfunctional (meth)acrylic monomer will be described, respectively.

Examples of (a) the aliphatic monofunctional (meth) acrylic monomer include an alkyl (meth)acrylic monomer such as a (meth)acrylic monomer, a methyl (meth)acrylic monomer, an ethyl (meth)acrylic monomer, a butyl (meth) acrylic monomer, a lauryl (meth)acrylic monomer, and a stearyl (meth)acrylic monomer; an alkoxy alkylene glycol (meth)acrylic monomer such as a methoxy propylene glycol (meth)acrylic monomer and an ethoxy diethylene glycol (meth)acrylic monomer; and a N-substituted acrylamide monomer such as a (meth)acrylamide monomer and a N-butoxymethyl (meth)acrylamide monomer.

Examples of (b) the aliphatic polyfunctional (meth)acrylic monomer include an alkylene glycol di(meth)acrylic monomer such as a 1,6-hexanediol di(meth)acrylic monomer, a 1,4-butanediol di(meth)acrylic monomer, an ethylene glycol di(meth)acrylic monomer, a diethylene glycol di(meth)acrylic monomer, a triethylene glycol di(meth)acrylic monomer, a tetraethylene glycol di(meth)acrylic monomer, a tripropylene glycol di(meth)acrylic monomer, a neopentyl glycol di(meth)acrylic monomer, a polyethylene glycol di(meth)acrylic monomer and a polybutanediol di(meth)acrylic monomer; a tri(meth)acrylic monomer such as a pentaerythritol triacrylic monomer, a trimethylolpropane tri(meth)acrylic monomer, and an ethylene oxide- or a propylene oxide-modified trimethylolpropane triacrylic monomer; a tetra(meth)acrylic monomer such as a pentaerythritol tetraacrylic monomer and a ditrimethylolpropane tetra(meth)acrylic monomer; and a penta(meth)acrylic monomer such as a dipentaerythritol(monohydroxy)pentaacrylic monomer.

As (c) the alicyclic (meth)acrylic monomer, a cyclohexyl (meth)acrylic monomer or the like can be included as the monofunctional type. Also, a dicyclopentadienyl di(meth)acrylic monomer or the like can be included as the polyfunctional type.

As (d) the aromatic (meth)acrylic monomer, a phenyl (meth)acrylic monomer, a benzyl (meth)acrylic monomer, a phenoxyethyl (meth)acrylic monomer, a phenoxy diethylene glycol (meth)acrylic monomer or the like can be included as the monofunctional type. Also, diacrylic monomers such as a bisphenol A di(meth)acrylic monomer, a bisphenol F di(meth)acrylic monomer or the like can be included as the polyfunctional type.

Example of (e) the polyurethane (meth)acrylic monomer include a polyurethane ether (meth)acrylic monomer, a polyester (meth)acrylic monomer.

Example of (f) the epoxy (meth)acrylic monomer include a bisphenol A-type epoxy acrylic monomer, a novolac-type epoxy acrylic monomer.

This vinyl-based monomer is used together with the organic ligand-containing monomer, copolymerized using a polymerization initiator, and forms the organic polymer compound of the present embodiment which is a copolymer.

A percentage of this monomer containing the organic ligand with regard to the total monomers is preferably 0.01% by mole or more and 15% by mole or less and more preferably 0.03% by mole or more and 1% by mole or less.

Here, the reason to limit the percentage of this monomer containing the organic ligand with regard to the total monomers is that, if this percentage is less than 0.01% by mole, light emission characteristics are reduced since the amount of the organic ligand is too small and, on the other hand, if this percentage exceeds 15% by mole, film formation is not possible due to lack of moldability and processibility as an organic polymer compound since the amount of the organic ligand is too large.

The polymerization initiator may initiate the polymerization of the monomer by generating radicals using heat, light (such as ultraviolet rays) or the like in addition to chemical reactions which are generally used. Furthermore, using gamma ($\gamma$) rays or an electron beam to initiate the polymerization of the monomer is helpful in the organic polymer compound formation since no polymerization initiator is necessary.

Examples of this polymerization initiator include a peroxide-based polymerization initiator such as lauroyl peroxide, benzoyl peroxide, di-t-butyl peroxide, t-butyl peroxy-2-ethylhexanoate, t-butyl peroxyisobutyrate, t-butyl peroxypivalate, t-butyl peroxybenzoate and t-butyl peroxyacetate, and an azo-based polymerization initiator such as 2,2'-azobisisobutyronitrile.

In addition, examples of the photoinitiator include acetophenone, 1-(4-isopropylphenyl)-2-hydroxy-2-methylpropane-1-one, 2-hydroxy-2-methyl-1-phenylpropan-1-one, 2,2-dimethoxy-2-phenylacetophenone, 2-methyl-[4-(methylthio)phenyl]-2-morpholino-1-propanone, 1,4-dibenzoylbenzene, 1,2-diphenylethanedione, 1-hydroxycyclohexyl phenyl ketone, and benzophenone.

A mixing amount of this polymerization initiator is preferably 0.1% by mass or more and 5% by mass or less with regard to the total amount of the organic ligand-containing monomer and the vinyl-based monomer.

"Composition for Formation of Organic-Inorganic Composite"

The composition for formation of an organic-inorganic composite of the present embodiment includes metal oxide particles, an organic polymer compound containing organic ligands which are bonded to a polymer chain through covalent bonds and are capable of forming coordinate bonds to metal atoms on the surface of the metal oxide particles (hereinafter, referred to as an organic polymer compound containing organic ligands), or a monomer or an oligomer for forming the organic polymer compound containing the organic ligands. This composition for formation of an organic-inorganic composite may also include an organic solvent.

First of all, the composition for formation of an organic-inorganic composite containing the metal oxide particles, the organic polymer compound containing the organic ligands, and the organic solvent will be described.

The state of this composition for formation of an organic-inorganic composite is that the metal oxide particles and the organic polymer compound containing the organic ligands are dispersed and dissolved in the organic solvent, and also, the organic ligands in this organic polymer compound containing the organic ligands bond by forming a complex with metal atoms on the surface of the metal oxide particles.

As the organic solvent, a solvent which can disperse the metal oxide particles and dissolve the organic polymer compound containing the organic ligands can be included. Preferable examples of the organic solvent used include alcohols such as methanol, ethanol, 2-propanol, butanol, and octanol, esters such as ethyl acetate, butyl acetate, ethyl lactate, propylene glycol monomethyl ether acetate, propylene glycol monoethyl ether acetate, and $\gamma$-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol mono ethyl ether, ketones such as acetone, methyl ethyl ketone, methyl isobutyl ketone, acetylacetone, and cyclohexanone, aromatic hydrocarbons such as benzene, toluene, xylene and ethylbenzene, amides such as dimethyl formamide, N,N-dimethylacetamide, N-methylpyrrolidone. The solvent may be used either alone or as a combination of two or more.

The surface of the metal oxide particle needs to be hydrophilic to the organic solvent in order to disperse these metal oxide particles in the organic solvent. Therefore, surface treatment is carried out so as to make the surface of the metal oxide particle hydrophilic.

The types of surface treating agent which is used in the surface treatment can be appropriately selected depending on the types of metal oxide particles and the organic solvent, however, in particular, a surface treating agent in which the organic ligands are coordinated to the metal atoms on the surface of the metal oxides, and which can be easily removed after film formation is preferable, and, for example, may be an organic acid such as carboxylic acid which weakly bonds to the metal oxide particles.

As means to disperse the metal oxide particles in the organic solvent, a bead mill using zirconia beads, a ball mill or the like can be suitably used. As the time necessary for the dispersion treatment, the time for the metal oxide particles to be surface treated with the surface treating agent is sufficient, and normally, it is 1 to 6 hours. As a result, the metal oxide particles become surfaced-treated metal oxide particles of which surfaces are treated with the surface treating agent.

As the organic polymer compound containing the organic ligands, a copolymer which is obtained by a polymerization reaction in which the polymerization initiator is added to the solution including the organic ligand-containing monomer bonded to the monomer having the polymerizable unsaturated group through covalent bonds and the vinyl-based monomer, is preferable.

Here, the method to process the polymerization reaction may include, for example, a solution polymerization method using a radical polymerization reaction initiated by a heating method or light irradiation. As this radical polymerization reaction, a polymerization reaction by heat (thermal polymerization), a polymerization reaction by light such as ultraviolet rays (photopolymerization), a polymerization reaction by gamma rays, or a combination of multiple of these methods can be included.

In order to obtain the composition for formation of an organic-inorganic composite of the present embodiment, first of all, the polymerization reaction is carried out by adding the polymerization initiator to the solution in which the organic ligand-containing monomer and the vinyl-based monomer are dissolved. In the solution obtained after the polymerization, the copolymer containing the organic ligands is formed and the organic polymer compound containing the organic ligands can be obtained by removing the organic solvent using an evaporator.

This organic polymer compound containing the organic ligands is then introduced to a dispersion liquid in which the surface-treated metal oxide particles are dispersed in the organic solvent, and is heated and stirred as necessary so that this organic polymer compound containing the organic ligands is dissolved in the organic solvent. In this process, the organic ligands and the metal elements in the metal oxide particles form a complex and the organic polymer compound containing the organic ligands and the metal oxide particles are bonded. In addition, the surface treating agent on the surface of the surface-treated metal oxide particles is desorbed from the surface of the metal oxide particles by a ligand exchange with the organic ligands or the like. In this case, the desorbed surface treating agent remains in the organic solvent, however, this remaining surface treating agent can be easily removed by heating, reduced pressure, or extraction, in the preparation process of the organic-inorganic composite afterwards.

The composition for formation of an organic-inorganic composite of the present embodiment can be obtained in this way.

Subsequently, the organic-inorganic composite of the present embodiment is prepared using this composition for formation of an organic-inorganic composite.

Here, a case in which the organic-inorganic composite of the present embodiment is a film-shaped product and a bulk-form product will be described.

For a case of the film-shaped product, a coated film is obtained by coating the composition for formation of an organic-inorganic composite on a substrate using a coating method such as a screen printing method, an offset printing method, a spin coating method or a roll coating method.

Also, for a case of the bulk-form product, a molded product is obtained by molding the composition for formation of an organic-inorganic composite using a mold. Alternatively, a molded product is obtained by removing part or most of the solvent from the composition and then packing the composition within a mold or a container.

Then, after this film-shaped product or this molded product is obtained, organic solvent is removed from the film-shaped product or the molded product. Part or all of the solvent may also be removed at the same time when the film-shaped product or the molded product is formed. As the organic solvent removing method, any method can be used as long as the film-shaped product or the molded product is not deformed or altered, however, particularly, a heating method in the atmosphere or under reduced pressure is suitable. As the heating method, irradiation treatment of infrared rays or the like, in addition to using a normal heater, can be used.

The film-shaped and bulk-shaped organic-inorganic composite of the present embodiment can be obtained in this way by removing the organic solvent.

In addition, the organic-inorganic composite may be further cured by performing heat treatment or irradiation treatment of ultraviolet rays, gamma rays, or an electron beam on the organic-inorganic composite obtained and copolymerizing the polymer compound containing the organic ligand.

The organic-inorganic composite copolymerized by the method described above does not easily dissolve even in the organic solvent which is used for the composition for formation of an organic-inorganic composite, therefore, a more stabilized organic-inorganic composite can be obtained.

Next, the composition for formation of an organic-inorganic composite which contains the metal oxide particles and the monomer or the oligomer in order to form the organic polymer compound containing the organic ligands, however, not containing the organic solvent will be described.

In the following description, the monomer or the oligomer may also be referred as the monomer (oligomer).

In the composition for formation of an organic-inorganic composite, in order to form the organic polymer compound containing the organic ligands, at least one of the monomer (oligomer) containing the organic ligand bonded to the monomer having the polymerizable unsaturated group through covalent bonds and the vinyl-based monomer (oligomer) needs to be liquid, and the other needs to be dissolved in a liquid monomer (oligomer). It is also in a state such that the metal oxide particles are dispersed in the mixture of the liquid monomer (oligomer) containing the organic ligand and the vinyl-based monomer (oligomer), and the organic ligand in this monomer (oligomer) containing the organic ligand is bonded to the metal oxide particles by forming a complex with the organic ligand and the metal atoms on the surface of the metal oxide particles.

In the present embodiment, surface treatment of the metal oxide particles is not absolutely necessary since the metal oxide particles are directly dispersed in the liquid including the monomer (oligomer) containing the organic ligand. In addition, types and characteristics of the surface treating agents used in the surface treatment are the same as the embodiment including the metal oxide particles, the organic polymer compound containing the organic ligands and the organic solvent.

In order to obtain the composition for formation of an organic-inorganic composite of the present embodiment, first, the monomer (oligomer) containing the organic ligand and the vinyl-based monomer (oligomer) are mixed and the metal oxide particles are dispersed therein. As the means for mixing and dispersing, heating and stirring, a bead mill using zirconia beads, a ball mill or the like can be suitably used. In this process, the organic ligands and the metal elements in the metal oxide particles form a complex and the monomer (oligomer) containing the organic ligand and the metal oxide particles are bonded.

When the surface of the metal oxide particles is treated, the surface treating agent is desorbed from the surface of the metal oxide particles by a ligand exchange with the organic ligands or the like, however, it remains while the monomer (oligomer) containing the organic ligand and the vinyl-based monomer (oligomer) are mixed, and therefore, needs to be removed.

The composition for formation of an organic-inorganic composite of the present embodiment can be obtained in this way.

Subsequently, the organic-inorganic composite of the present embodiment is prepared using this composition for formation of an organic-inorganic composite.

In the composition for formation of an organic-inorganic composite, the monomer (oligomer) containing the organic ligand and the metal oxide particles are bonded by forming the complex while the organic polymer compound containing the organic ligands is not formed, therefore, by polymerizing the monomer (oligomer) containing the organic ligand and the vinyl-based monomer (oligomer) resulting in a copolymer, and by obtaining a solidified polymer including the metal oxide particles, the organic-inorganic composite of the present embodiment can be obtained.

The polymerization initiator is added to the polymerization of both components and examples of the method to process the polymerization reaction include a solution polymerization method using a radical polymerization reaction initiated by a heating method or light irradiation. Examples of this radical polymerization reaction include, a polymerization reaction by heat (thermal polymerization), a polymerization reaction by light such as ultraviolet rays (photopolymerization), a polymerization reaction by gamma rays, and a combination of multiple of these methods. As for the polymerization initiator, the timing of addition can be determined based on the working conditions, however, it may be added during the preparation of the composition for formation of an organic-inorganic composite, immediately before the preparation of the organic-inorganic composite or the like.

In order to prepare the organic-inorganic composite of the present embodiment, after adding the polymerization initiator to the composition for formation of an organic-inorganic composite, the coated film or the molded product is obtained using the same method as the embodiment for the composition for formation of an organic-inorganic composite containing the metal oxide particles, the organic polymer compound containing the organic ligands and the organic solvent, and further polymerizing the monomer (oligomer) containing the organic ligand and the vinyl-based monomer (oligomer). In addition, the organic solvent does not have to be removed since the composition for formation of an organic-inorganic composite of the present embodiment does not include the organic solvent.

The film-shaped or the bulk-shaped organic-inorganic composite of the present embodiment can be obtained in this way.

Next, the composition for formation of an organic-inorganic composite containing the metal oxide particles, the monomer or the oligomer in order to form the organic polymer compound containing the organic ligands, and the organic solvent will be described.

The state of this composition for formation of an organic-inorganic composite is that the metal oxide particles and the monomer (oligomer) containing the organic ligand and the vinyl-based monomer (oligomer) are dispersed and dissolved in the organic solvent, and also, the organic ligand in this monomer (oligomer) containing the organic ligand is bonded by forming a complex with metal atoms on the surface of the metal oxide particles.

As the organic solvent, any solvent can be uses as long as it can disperse the metal oxide particles and dissolve the monomer (oligomer) containing the organic ligand and the vinyl-based monomer (oligomer) containing the organic ligand. The method and means to select the organic solvent or to disperse the metal oxide particles in the organic solvent the same as those of the composition for formation of an organic-inorganic composite containing the metal oxide particles, the organic polymer compound containing the organic ligand and the organic solvent.

In order to obtain the composition for formation of an organic-inorganic composite of the present invention, first, the solution in which the monomer (oligomer) containing the organic ligand and the vinyl-based monomer (oligomer) are dissolved is prepared, this solution and the dispersion liquid in which the surface-treated metal oxide particles are dispersed in the organic solvent are then mixed, and is heated and stirred, if necessary, so that the solution and the dispersion liquid are homogenized. In this process, the organic ligands and the metal atoms on the metal oxide particles form a complex and the monomer (oligomer) containing the organic ligand and the metal oxide particles are bonded. In addition, the surface treating agent on the surface of the surface-treated metal oxide particles is desorbed from the surface of the metal oxide particles by a ligand exchange with the organic ligands or the like. In this case, the desorbed surface treating agent remains in the organic solvent, however, this remaining surface treating agent can be easily removed by heating, reduced pressure, or extraction, in the preparation process of the organic-inorganic composite afterwards.

The composition for formation of an organic-inorganic composite of the present embodiment can be obtained in this way.

Subsequently, the organic-inorganic composite of the present embodiment is prepared using this composition for formation of an organic-inorganic composite.

In the composition for formation of an organic-inorganic composite, the monomer (oligomer) containing the organic ligand and the metal oxide particles are bonded by forming a complex while the organic polymer compound containing the organic ligands is not formed, therefore, after polymerizing the monomer (oligomer) containing the organic ligand and the vinyl-based monomer (oligomer) resulting in the organic polymer compound containing the organic ligands, the organic-inorganic composite of the present embodiment can be obtained by removing the organic solvent. In addition, from the composition for formation of an organic-inorganic composite of the present embodiment, after part or all or the organic solvent is first removed, the monomer (oligomer) containing the organic ligand and the vinyl-based monomer (oligomer) can be polymerized.

The polymerization initiator may be added to the polymerization of the monomer (oligomer) containing the organic ligand and the vinyl-based monomer (oligomer) and examples of the method to process the polymerization reaction include a solution polymerization method using a radical polymerization reaction initiated by a heating method or light irradiation. Examples of this radical polymerization reaction include a polymerization reaction by heat (thermal polymerization), a polymerization reaction by light such as ultraviolet rays (photopolymerization), a polymerization reaction by gamma rays, or a combination of multiple of these methods Furthermore, in the present embodiment, the organic polymer compound containing the organic ligands obtained by polymerization of the monomer (oligomer) containing the organic ligand and the vinyl-based monomer (oligomer) is preferably dissolved in the organic solvent. If it is not soluble or has low solubility, the obtained organic polymer compound containing the organic ligands and the organic solvent in which the metal oxide particles are dispersed generate phase separation, and therefore, a homogeneous organic-inorganic composite may not be obtained.

In order to obtain the preparation method of the organic-inorganic composite of the present embodiment, after the polymerization initiator is added to the composition for formation of an organic-inorganic composite, the coated film or the molded product is obtained using the same method as the embodiment for the composition for formation of an organic-inorganic composite containing the metal oxide particles, the organic polymer compound containing the organic ligands and the organic solvent, Next, the organic solvent is removed after the monomer (oligomer) containing the organic ligand and the vinyl-based monomer (oligomer) are polymerized, or the monomer (oligomer) containing the organic ligand and the vinyl-based monomer (oligomer) may be polymerized after the organic solvent is removed. Part or all of the organic solvent can also be removed at the same time when the film-shaped product or the molded product is formed.

As the organic solvent removing method, any method can be used as long as the film-shaped product or the molded product is not deformed or altered, however, particularly, a heating method in an inert atmosphere such as nitrogen gas or argon gas, or under reduced pressure is suitable. As the heating method, irradiation of infrared rays or the like, in addition to using a normal heater, can be used.

The film-shaped and bulk-shaped organic-inorganic composite of the present embodiment can be obtained in this way by removing and polymerizing the organic solvent.

In addition, the organic-inorganic composite may be further cured by performing irradiation treatment of ultraviolet rays, gamma rays, or an electron beam on the organic-inorganic composite obtained and copolymerizing the polymer compound containing the organic ligand.

Next, the composition for formation of an organic-inorganic composite which contains the metal oxide particles and the organic polymer compound containing the organic ligands, however, not containing the organic solvent will be described.

The state of this composition for formation of an organic-inorganic composite is that the metal oxide particles are dispersed in the liquefied organic polymer compound containing the organic ligands, and also, the organic ligands in this organic polymer compound containing the organic ligands are bonded by forming a complex with metal atoms on the surface of the metal oxide particles. The polymer chain part in the polymer compound containing the organic ligands of the present embodiment is the polyvinyl-based polymer which has thermoplasticity and includes a vinyl-based monomer as a structural unit, therefore, the organic polymer compound containing the organic ligands is easily liquefied by heating and this combination is also easily carried out.

The composition for formation of an organic-inorganic composite in the present embodiment can be obtained using the same components and methods as those of the composition for formation of an organic-inorganic composite containing the metal oxide particles, the organic polymer compound containing the organic ligand and the organic solvent. That is, the composition for formation of an organic-inorganic composite in the present embodiment can be obtained by first obtaining the organic polymer compound containing the organic ligands using the method described above, and then melting and liquefying the organic polymer compound containing the organic ligands by heating or the like, and introducing and dispersing the metal oxide particles.

In addition, the organic solvent is not present and the metal oxide particles are directly dispersed in the liquefied organic polymer compound containing the organic ligands, therefore, surface treatment of the metal oxide particles is not absolutely necessary.

The method to prepare the organic-inorganic composite of the present embodiment using this composition for formation of an organic-inorganic composite can also use the same method as those of the composition for formation of an organic-inorganic composite containing the metal oxide particles, the organic polymer compound containing the organic ligand and the organic solvent, however, the coated film or the molded product can be solidified by cooling since the composition for formation of an organic-inorganic composite of the present embodiment is liquefied by heating.

The film-shaped and bulk-shaped organic-inorganic composite of the present embodiment can be obtained in this way.

According to the organic-inorganic composite of the present embodiment, metal oxide particles and an organic polymer compound containing organic ligands which are bonded to a polymer chain through covalent bonds are included, and these organic ligands of the organic polymer compound form a complex with metal atoms on the surface of the metal oxide particles, therefore, are bonded to the metal oxide particles, along with forming a light emission site, and as a result, light emission characteristics such as light emission intensity or stabilization of light emission wavelength of the organic-inorganic composite can be improved, and transparency and mechanical characteristics such as thermal stability or hardness can also be improved. Therefore, uniform composites having satisfactory optical characteristics or mechanical characteristics can be provided.

The organic-inorganic composite of the present embodiment can be easily obtained from the composition for formation of an organic-inorganic composite of the present embodiment by removing the organic solvent, or forming the organic polymer compound containing the organic ligand by polymerizing the monomer or oligomers containing the organic ligand and the vinyl-based monomer or oligomer, or by combining these. In addition, the organic-inorganic composite obtained from the composition for formation of an organic-inorganic composite of the present embodiment can be an organic-inorganic composite having excellent thermal, optical, and mechanical characteristics since the inorganic dispersed phase in which the organic polymer compound is crosslinked by the metal oxide particles can be easily formed.

Furthermore, there is no risk causing problems such as white turbidity due to aggregation since the metal oxide particles are homogeneously dispersed in the organic polymer compound.

The light emission characteristics are improved and discoloration due to degradation of the organic ligand can be reduced and by stabilizing the organic ligand by a polymer effect since the organic ligand is bonded to the polymer chain through covalent bonds.

A flexible or a film-shaped organic-inorganic composite is easily obtained from maintaining flexibility and moldability of the organic polymer compound by using the metal oxide particles as an inorganic component, and dispersing homogeneously the metal oxide particles into the organic polymer compound.

In addition, there are no concerns of complicated manufacturing processes and high manufacturing costs since this organic polymer compound is not a π-conjugated polymer.

According to the composition for formation of an organic-inorganic composite of the present embodiments, the metal oxide particles can be homogeneously dispersed and dissolved in the composition for formation of an organic-inorganic composite, since the metal oxide particles and the organic polymer compound containing the organic ligands or the monomer or oligomer for forming the organic polymer compound containing the organic ligands are included, therefore, light emission characteristics and transparency of the organic-inorganic composite obtained from this composition for formation of an organic-inorganic composite can be improved.

Also, when the organic compound is included, the organic-inorganic composite can be easily prepared with a treatment at a low temperature of approximately room temperature to 150° C., using a wet process in which this organic solvent is volatilized and removed.

Heat treatment can also be carried out to this organic polymer compound under a normal atmosphere since a metal alkoxide used in conventional metal complex syntheses is not included. Therefore, the organic-inorganic composite of the present invention can be easily prepared using this composition for formation of an organic-inorganic composite and common simple manufacturing devices.

"Ink"

The ink of the present embodiment is an ink which includes metal oxide particles, an organic polymer compound containing organic ligands which are bonded to a polymer chain through covalent bonds and are capable of forming coordinate bonds to metal atoms on the surface of the metal oxide particles, or a monomer or oligomer for forming the organic polymer compound containing the organic ligands, and an organic solvent, and is suitably used for an ink jet and the like, in addition to printing.

The description on the metal oxide particles, the organic polymer compound and the organic solvent included in the ink will not be repeated since it is the same as the metal oxide particles, the organic polymer compound and the organic solvent in the composition for formation of an organic-inorganic composite described above.

In addition, the organic solvent described above has actions as a dispersion medium of the metal oxide particles, as a solvent of the organic polymer compound containing the organic ligands which are bonded to the polymer chain through covalent bonds and are capable of forming coordinate bonds to the metal atoms on the surface of the metal oxide particles, and as a solvent of the monomer or oligomer in order to form the organic polymer compound containing the organic ligands, however, in addition to these, it is added to impart suitable characteristics to be used as ink such as viscosity or a thixotropic property of ink. A drying property to prevent smearing or deformation of patterns after printing or compatibility with the printed material and the like can also need to be considered. Therefore, it is preferable that the types or the amount of the organic solvent be determined considering these various conditions.

Furthermore, in the ink of the present embodiment, the organic-inorganic composite in a target shape can be easily prepared by printing this ink using a printing machine, or patterning or molding by discharging using an ink jet, along with obtaining the same actions and effects as those for the composition for formation of an organic-inorganic composite of the present embodiment.

EXAMPLES

Hereinafter, the present invention will be described in detail with reference to Examples and Comparative Examples, however, the present invention is not limited to these Examples.

Here, the organic ligand-containing monomer and the copolymer thereof, the surface-treated zirconium oxide particles, and the surface-treated aluminum oxide particles used in Examples and Comparative Examples are prepared as follows.

[Preparation of Monomer Containing Organic Ligand and Copolymer Thereof-1]

(An example of the organic ligand having a phenolic hydroxyl group and a heterocyclic ring of which a nitrogen atom is a heteroatom as the organic ligand-containing monomer used for green light emission and the copolymer thereof)

5.84 g of 8-quinolinol, 70 mL of concentrated hydrochloric acid, and 6.4 mL of 37% formaldehyde were introduced to a 250 mL three-neck flask equipped with a stirrer chip and the mixture was reacted for 10 hours. Then, yellow crystals precipitated were filtered using a filter and were washed with a large amount of acetone. The crystals were subsequently vacuum-dried for 12 hours at 40° C. under vacuum and 5-chloromethyl-8-quinolinol hydrochloride was obtained. The yield of this hydrochloride was 92%.

Next, 20 g of 2-hydroxyethyl methacrylate, 0.20 g of p-methoxyphenol, and 1.78 g of sodium acetate were introduced to a 500 mL three-neck flask equipped with a stirrer chip, and after the mixture was kept for 1.5 hours at 50° C., 5.0 g of the 5-chloromethyl-8-quinolinol hydrochloride was added and the mixture was reacted for 2 hours at 90° C. After that, this reaction solution was cooled to room temperature, poured into ice water, neutralized with aqueous ammonia, and then the crystals precipitated were washed with ice water, collected using a filter, and recrystallized from petroleum ether, resulting in 5.2 g of 5-methyl(2-methacryloyl-ethyloyl)-8-quinolinol (the monomer containing the organic ligands).

The organic ligand-containing monomer obtained was then measured by $^1$H-NMR in deuterated chloroform and peaks of 8.78 to 7.08 ppm (Ph-H), 6.03 ppm (=CH$_2$), 5.52 ppm (=CH$_2$), 4.87 ppm (—CH$_2$-Ph), 4.27 ppm, 3.69 ppm (—CH$_2$—O), and 1.88 (—CH$_3$) were observed. Therefore, isolation of the monomer containing the organic ligands, a target compound, was confirmed.

Subsequently, 25 mL of toluene, 5.0 g (50 mmol) of methyl methacrylate, 0.58 g (2 mmol) of the 5-methyl(2-methacryloylethyloyl)-8-quinolinol (the organic ligand-containing monomer), and 0.085 g (0.52 mmol) of 2,2'-azobisisobutyronitrile were introduced to a 50 mL two-neck eggplant-shaped flask equipped with a stirrer chip, and polymerization reaction was carried out by stirring the mixture at 60° C. for 40 hours under a nitrogen atmosphere.

This reaction solution was cooled to room temperature, poured into methanol, and a copolymer was obtained as a precipitate. After that, the solvent was removed by an evaporator, the precipitate was vacuum-dried, and 4.8 g of the copolymer A containing the organic ligands was obtained.

Based on GPC measurement, an average molecular weight of this copolymer A containing the organic ligands was 19,000 in number average molecular weight (Mn) and 42,000 in weight average molecular weight (Mw). Measurement by $^1$H-NMR in deuterated chloroform was also carried out to compare the peak intensities of the protons in the heterocyclic ring of 8-quinolinol with the protons in the methyl group in methyl methacrylate and the result was 1 mol of 5-methyl(2-methacryloylethyloyl)-8-quinolinol with regard to 25 mol of methyl methacrylate. Therefore, it was confirmed that the copolymer A containing the organic ligands was formed in the same ratio as the input ratio.

[Preparation of Monomer Containing Organic Ligand and Copolymer Thereof-2]

(An example of the organic ligand having a β-diketone structure as the monomer containing the organic ligands used for blue light emission and the copolymer thereof)

10 g of 4-hydroxybenzoate, 200 mL of cyclohexanone, 5.50 g of potassium iodide, and 18.1 g of potassium carbonate were introduced to a 250 mL three-neck flask equipped with a stirrer chip and were dissolved by stirring under a nitrogen atmosphere. 12 mL of 2-chloroethanol was then added dropwise using a syringe and the mixture was reacted for 1 day at 120° C.

The reaction solution from which precipitates were filtered using a filter was subsequently dried and an oil-like product was obtained. This product was purified using silica-gel column chromatography and methyl 4-(2-hydroxyethoxy)benzoate was obtained. The yield was 85%.

Then, 10 mL of tetrahydrofuran (THF) and 2.40 g of 60% NaH were introduced to a 50 mL two-neck flask equipped with a stirrer chip and a solution of 4.60 g of 4'-methoxyacetophenone dissolved in 6 mL of THF was added dropwise. The temperature was increased to 40° C. and a solution of 7.06 g of methyl 4-(2-hydroxyethoxy)benzoate dissolved in 11 mL of THF was added dropwise, and after completion of the dropwise addition, the mixture was heated to 60° C. and reacted for 10 hours.

After the reaction was completed, the mixture was cooled to 40° C., 30 mL of water and 20 mL of toluene were introduced and, after pH was adjusted to around 3 using sulfuric acid, the bottom layer liquid was separated. The upper layer of a toluene layer was washed with 5 mL of water, this toluene layer was then concentrated using an evaporator, recrystallized with 2-propanol (IPA), and white crystals of 4-methoxy-4'-(2-hydroxyethoxy)dibenzoylmethane were obtained. The yield was 35%.

Then, 45 mL of toluene, 4.72 g of 4-methoxy-4'-(2-hydroxyethoxy)dibenzoylmethane, 0.09 g of hydroquinone, 1.59 g of methacrylic acid, and 0.27 of p-toluenesulfonoic acid monohydrate were introduced to a 100 mL two-neck flask equipped with a stirrer chip and a Dean-Stark (a moisture evaporator), the temperature was then increased to 120° C., and the reaction was carried out for 24 hours at this temperature under reflux while water generated was removed by evaporation. After the reaction was completed, the mixture was cooled to 50° C., 15 mL of water was added, pH was adjusted to around 5 using aqueous sodium hydroxide solution, and the bottom layer liquid was separated. The upper layer of toluene layer was washed with 5 mL of water, this toluene layer was then concentrated using an evaporator, recrystallized with IPA, and white crystals of 4-methoxy-4'-methacryloyloxyethoxydibenzoylmethane were obtained. The yield was 33%.

The monomer containing the organic ligands obtained was then measured by $^1$H-NMR in deuterated chloroform and peaks of 8.02 to 6.95 ppm (Ph-H), 6.73 ppm (—CH$_2$—), 6.15 ppm, 5.61 ppm (=CH$_2$), 4.54 ppm, 4.30 ppm (—CH$_2$—O), 3.89 ppm (—O—CH$_3$), and 1.96 (—CH$_3$) were observed. Therefore, isolation of the monomer containing the organic ligands, a target compound, was confirmed.

Subsequently, 25 mL of toluene, 5.0 g (50 mmol) of methyl methacrylate, 0.77 g (2 mmol) of the 4-methoxy-4'-methacryloyloxyethoxydibenzoylmethane (the monomer containing the organic ligands), and 0.085 g (0.52 mmol) of 2,2'-azobisisobutyronitrile were introduced to a 50 mL two-neck eggplant-shaped flask equipped with a stirrer chip, and polymerization reaction was carried out by stirring the mixture at 60° C. for 40 hours under a nitrogen atmosphere.

This reaction solution was cooled to room temperature, poured into methanol, and a copolymer was obtained as a precipitate. After that, the solvent was removed by an evaporator, the precipitate was vacuum-dried, and 4.5 g of the copolymer B containing the organic ligands was obtained.

Based on GPC measurement, an average molecular weight of this copolymer B containing the organic ligands was 20,000 in number average molecular weight (Mn) and 39,000 in weight average molecular weight (Mw). Measurement by $^1$H-NMR in deuterated chloroform was also carried out to compare the peak intensities of the protons in the aromatic ring of 4-methoxybenzoylmethane with the protons in the methyl group in methyl methacrylate and the result was 1 mol of 4-methoxy-4'-methacryloyloxyethoxydibenzoylmethane with regard to 25 mol of methyl methacrylate. Therefore, it was confirmed that the copolymer B containing the organic ligands was formed in the same ratio as the input ratio.

[Preparation of Monomer Containing Organic Ligand and Copolymer Thereof-3]

(An example of the organic ligand having a β-diketone structure as the monomer containing the organic ligands used for yellow light emission and the copolymer thereof)

2.42 g of (1E,6E)-1,7-bis(4-hydroxy-3-methoxyphenyl)hepta-1,6-diene-3,5-dione (curcumin), 10 mL of THF, and 0.28 g of 60% NaH were introduced to a 30 mL two-neck flask equipped with a stirrer chip and were dissolved by stirring under a nitrogen atmosphere. The temperature was increased to 40° C. and then a solution of 0.72 mL of 2-bromoethanol dissolved in 2 mL of THF was added dropwise, and after completion of the dropwise addition, the mixture was heated to 60° C. and reacted for 10 hours.

After the reaction was completed, the mixture was cooled to 40° C., 30 mL of water and 20 mL of toluene were introduced and, after pH was adjusted to around 4 using sulfuric acid, the bottom layer liquid was separated. After the upper layer of toluene layer was washed with 5 mL of water, this toluene layer was concentrated using an evaporator, this concentrate was then purified using silica-gel column chromatography and (1E,6E)-1-(4-hydroxy-3-methoxyphenyl)-7-(4-hydroxyethoxy-3-methoxyphenyl)hepta-1,6-diene-3,5-dione was obtained. The yield was 20%.

Then, 5 mL of THF, 0.40 g of the (1E,6E)-1-(4-hydroxy-3-methoxyphenyl)-7-(4-hydroxyethoxy-3-methoxyphenyl)hepta-1,6-diene-3,5-dione, and 0.02 mL of triethylamine were introduced to a 20 mL two-neck flask equipped with a stirrer chip and were dissolved by stirring under a nitrogen atmosphere while cooling with ice. A solution of 0.30 g of methacryloyl chloride dissolved in 2 mL of THF was subsequently added dropwise, stirred and reacted for 3 hours while kept in ice. After the reaction was completed, 30 mL of water and 20 mL of toluene were introduced and the bottom layer liquid was separated. The upper layer of toluene layer was washed with 5 mL of water, this toluene layer was then concentrated using an evaporator, recrystallized with IPA, and yellow crystals of (1E,6E)-1-(4-hydroxy-3-methoxyphenyl)-7-(4-methacrylolyoxyethoxy-3-methoxyphenyl)hepta-1,6-diene-3,5-dione (the monomer containing the organic ligands) were obtained. The yield was 35%.

The monomer containing the organic ligands obtained was then measured by $^1$H-NMR in dimethylsulfoxide (DMSO) and peaks of 9.70 ppm (—OH), 7.58 ppm, 6.78 ppm (diene), 7.35 ppm, 7.17 ppm, 6.85 ppm (Ph-H), 6.20 ppm, 5.89 ppm (=CH$_2$), 6.08 ppm (—CH$_2$—), 4.60 ppm, 4.35 ppm (—CH$_2$—O), 3.84 ppm (—O—CH$_3$), and 2.02 ppm (—CH$_3$) were observed. Therefore, isolation of the monomer containing the organic ligands, a target compound, was confirmed.

Subsequently, 25 mL of toluene, 5.0 g (50 mmol) of methyl methacrylate, 0.48 g (1 mmol) of the (1E,6E)-1-(4-hydroxy-3-methoxyphenyl)-7-(4-methacrylolyoxyethoxy-3-methoxyphenyl)hepta-1,6-diene-3,5-dione, and 0.084 g (0.51 mmol) of 2,2'-azobisisobutyronitrile were introduced to a 50 mL two-neck eggplant-shaped flask equipped with a stirrer chip, and polymerization reaction was carried out by stirring the mixture at 60° C. for 40 hours under a nitrogen atmosphere.

This reaction solution was cooled to room temperature, poured into methanol, and a copolymer was obtained as a precipitate. After that, the solvent was removed by an evaporator, the precipitate was vacuum-dried, and 4.6 g of the copolymer D containing the organic ligands was obtained.

Based on GPC measurement, an average molecular weight of this copolymer D containing the organic ligands was 19,000 in number average molecular weight (Mn) and 39,000 in weight average molecular weight (Mw). Measurement by $^1$H-NMR in deuterated chloroform was also carried out to compare the peak intensities of the protons in the methoxy group of (1E,6E)-1-(4-hydroxy-3-methoxyphenyl)-7-(4-methacrylolyoxyethoxy-3-methoxyphenyl)hepta-1,6-diene-3,5-dione with the protons in the methyl group in methyl methacrylate and the result was 1 mol of (1E,6E)-1-(4-hydroxy-3-methoxyphenyl)-7-(4-methacrylolyoxyethoxy-3-methoxyphenyl)hepta-1,6-diene-3,5-dione with regard to 50 mol of methyl methacrylate. Therefore, it was confirmed that the copolymer D containing the organic ligands was formed in the same ratio as the input ratio.

[Preparation of Monomer Containing Organic Ligand and Copolymer Thereof-4]

(An example of the organic ligand having a phenolic hydroxyl group and a heterocyclic ring of which a nitrogen atom is a heteroatom as the organic ligand-containing monomer used for red light emission and the copolymer thereof)

2.65 g of 8-benziloyl-5,7-dibromoquinoline, 1.12 g of 4-dimethylaminophenylboronic acid, 0.22 g of tetrabutylammonium chloride, and 60 ml of toluene were introduced to a 250 mL three-neck flask equipped with a stirrer chip and were dissolved by stirring. After 60 mL of degassed 1 mol-K$_2$CO$_3$ solution was added, 0.36 g of tetrakis triphenylphosphine palladium was added and the mixture was reacted for 24 hours at 90° C. under an argon atmosphere.

After the reaction was completed, this reaction solution was cooled to room temperature, the water layer was washed 3 times with 60 mL of toluene, the toluene layer was washed twice with 100 mL of water, and then this toluene layer was dehydrated with magnesium sulfate and concentrated using an evaporator. The concentrate obtained was purified using silica-gel column chromatography and 8-benzyloxy-5-(4-dimethylaminophenyl)-7-bromoquinoline was obtained. The yield was 45%.

1.20 g of the 8-benzyloxy-5-(4-dimethylaminophenyl)-7-bromoquinoline, 0.42 g of 3-hydroxyphenylboronic acid, 20 ml of toluene, and 10 mL of ethanol were introduced to a 100 mL three-neck flask equipped with a stirrer chip and were dissolved by stirring. After 15 mL of degassed 1 mol-K$_2$CO$_3$ solution was added, 0.15 g of tetrakis triphenylphosphine palladium was added and the mixture was reacted for 24 hours at 90° C. under an argon atmosphere.

After the reaction was completed, this reaction solution was cooled to room temperature, the water layer was washed 3 times with 30 mL of toluene, the toluene layer was washed twice with 60 mL of water, and then this toluene layer was dehydrated with magnesium sulfate and concentrated using an evaporator. The concentrate obtained was recrystallized with dichloromethane/hexane and yellow crystals of 8-benzyloxy-5-(4-dimethylaminophenyl)-7-(3-hydroxyphenyl)quinoline were obtained. The yield was 85%.

Subsequently, 0.89 g of the 8-benzyloxy-5-(4-dimethylaminophenyl)-7-(3-hydroxyphenyl)quinoline, 2.25 g of 1,2-dibromoethane, 0.22 g of potassium hydroxide, and 30 mL of THF were introduced to a 50 mL three-neck flask equipped with a stirrer chip and the mixture was reacted for 10 hours at 70° C. under an argon atmosphere. After this reaction solution was cooled to room temperature, 70 mL of toluene was introduced, this toluene layer was then washed with water, dehydrated with magnesium sulfate, and concentrated using an evaporator. The concentrate obtained was purified using silica-gel column chromatography and orange crystals of 8-benzyloxy-5-(4-dimethylaminophenyl)-7-{3-(2-bromoethoxyloylphenyl)}quinoline were obtained. The yield was 82%.

0.85 g of the 8-benzyloxy-5-(4-dimethylaminophenyl)-7-{3-(2-bromoethoxyloylphenyl)}quinoline, 0.35 g of palladium/carbon (Pd:10%), 0.8 g of cyclohexa-1,4-diene, and 10 mL of THF were subsequently introduced to a 20 mL two-neck flask equipped with a stirrer chip and the mixture was reacted for 12 hours at 70° C. under an argon atmosphere.

After the reaction was completed, this reaction solution was cooled to room temperature, carbon was removed using cerite, and the resultant was concentrated using an evaporator. The concentrate obtained was purified using silica-gel column chromatography and orange crystals of 5-(4-dimethylaminophenyl)-7-{3-(2-bromoethoxyloylphenyl)}-8-quinolinol were obtained. The yield was 90%.

Then, 0.47 g of the 5-(4-dimethylaminophenyl)-7-{3-(2-bromoethoxyloylphenyl)}-8-quinolinol, 0.14 g of potassium methacrylate, and 30 mL of THF were introduced to a 20 mL three-neck flask equipped with a stirrer chip and the mixture was reacted for 12 hours at 70° C. under an argon atmosphere.

After the reaction was completed, this reaction solution was cooled to room temperature, 70 mL of toluene was then introduced, this toluene layer was washed with water, dehydrated with magnesium sulfate, and concentrated using an evaporator. The concentrate obtained was recrystallized with dichloromethane/hexane and orange crystals of 5-(4-dimethylaminophenyl)-7-(3-methacryloyloxyethoxyphenyl)-8-quinolinol (the monomer containing the organic ligands) were obtained. The yield was 76%.

The organic ligand-containing monomer obtained was then measured by $^1$H-NMR in deuterated chloroform and peaks of 8.81 to 6.85 ppm (Ph-H), 6.10 ppm, 5.55 ppm (=CH$_2$), 4.30 ppm, 3.72 ppm (—CH$_2$—O), 3.04 ppm (—N—CH$_3$), and 1.90 (—CH$_3$) were observed. Therefore, isolation of the monomer containing the organic ligands a target compound, was confirmed.

Subsequently, 25 mL of toluene, 5.0 g (50 mmol) of methyl methacrylate, 0.47 g (1 mmol) of the 5-(4-dimethylaminophenyl)-7-(3-methacryloyloxyethoxyphenyl)-8-quinolinol, and 0.084 g (0.51 mmol) of 2,2'-azobisisobutyronitrile were introduced to a 50 mL two-neck eggplant-shaped flask equipped with a stirrer chip, and polymerization reaction was carried out by stirring the mixture at 60° C. for 40 hours under a nitrogen atmosphere.

This reaction solution was cooled to room temperature, poured into methanol, and a copolymer was obtained as a precipitate. After that, the solvent was removed by an evaporator, the precipitate was vacuum-dried, and 4.3 g of the copolymer E containing the organic ligands was obtained.

Based on GPC measurement, an average molecular weight of this copolymer containing the organic ligands E was 20,000 in number average molecular weight (Mn) and 48,000 in weight average molecular weight (Mw). Measurement by $^1$H-NMR in deuterated chloroform was also carried out to compare the peak intensities of the protons in the dimethylamino group of the organic ligand-containing monomer with the protons in the methyl group in methyl methacrylate and the result was 1 mol of 5-(4-dimethylaminophenyl)-7-(3-methacryloyloxyethoxyphenyl)-8-quinolinol with regard to 50 mol of methyl methacrylate. Therefore, it was confirmed that the copolymer E containing the organic ligands was formed in the same ratio as the input ratio.

[Preparation of Surface-Treated Zirconium Oxide Particles]

Surface treatment of the zirconium oxide particles was carried out by adding 100 g of water as dispersion medium, 100 g of methanol, and 3.0 g of acetic acid as a surface treating agent to 10 g of zirconium oxide particles (tetragonal type, 3 nm in average particle diameter), mixing and then dispersing the mixture by a bead mill using zirconia beads with a diameter of 0.1 mm.

Subsequently, solvent was removed from this solution using an evaporator and surface-treated zirconium oxide particles A were obtained. Surface-treated amount of this surface-treated zirconium oxide particles A, from the mass loss of the organic components by a thermogravimetric analysis (TGA), was 20% by mass with regard to the total mass of the oxide particles and the surface treating agent.

[Preparation of Surface-Treated Aluminum Oxide Particles]

Surface treatment of the aluminum oxide particles was carried out by adding 100 g of water as dispersion medium, 100 g of methanol, and 4.0 g of acetic acid as a surface treating agent to 10 g of aluminum oxide particles prepared by a hydrothermal method (boehmite type, 25 nm in average particle diameter, 200 nm in length), mixing and then dispersing the mixture by a bead mill using zirconia beads with a diameter of 0.1 mm.

Subsequently, solvent was removed from this solution using an evaporator and surface-treated aluminum oxide particles B were obtained. Surface-treated amount of this surface-treated aluminum oxide particles B, from the mass loss of the organic components by a thermogravimetric analysis (TGA), was 25% by mass with regard to the total mass of the oxide particles and the surface treating agent.

Example 1

The composition for formation of an organic-inorganic composite in Example 1 was prepared by introducing 16 mg of the surface-treated zirconium oxide particles A into 4 mL of ethylene glycol monoethyl ether (ethyl cellosolve), the mixture being stirred, mixed and made to be a transparent dispersion, and then 238 mg of the copolymer A containing the organic ligands being introduced and the mixture being stirred.

When this copolymer A containing the organic ligands was introduced and stirred, the color of the composition turned yellow from transparent. This visually confirmed that the zirconium oxide particles A and the organic ligand of the copolymer A containing the organic ligands formed the complex.

The composition was also measured by dynamic light scattering (DLS) and the dispersed particle diameter was increased to 13 nm after the copolymer A containing the organic ligands was introduced, compared to the dispersed particle diameter in ethylene glycol monoethyl ether dispersion of surface-treated zirconium oxide particle being 3 nm. Therefore, the presence of the composition for formation of an organic-inorganic composite of the present invention was confirmed from the formation of aggregation of the copolymer A containing the organic ligands and the zirconium oxide particles by the organic ligand of the copolymer A containing the organic ligands being bonded to the zirconium oxide particles through coordinate bonds.

The organic-inorganic composite in Example 1 was prepared by subsequently packing this composition for formation of an organic-inorganic composite in a Teflon (registered trademark) container and then drying at 120° C.

This organic-inorganic composite was measured by Fourier Transform Infrared Spectroscopy (FT-IR) and characteristic absorption peaks representing bidentation coordination of 8-quinolinol to the surface of zirconium oxide were observed at 1577 cm$^{-1}$, 1500 cm$^{-1}$, 1470 cm$^{-1}$, 1380 cm$^{-1}$, 1321 cm$^{-1}$, 1277 cm$^{-1}$, and 1107 cm$^{-1}$. This confirmed the presence of organic-inorganic composite of the present invention.

Example 2

The composition for formation of the organic-inorganic composite and the organic-inorganic composite in Example 2 were prepared in the same manner as that of Example 1 except that 31 mg of the surface-treated zirconium oxide particles A and 225 mg of the copolymer A containing the organic ligands were used.

This composition for formation of the organic-inorganic composite was measured by DLS and the dispersed particle diameter of the surface-treated zirconium oxide particles was increased to 15 nm, and when this organic-inorganic composite was measured by FT-IR, the same absorption peaks as those of the organic-inorganic composite in Example 1 were observed. This confirmed the presence of the composition for formation of the organic-inorganic composite and the organic-inorganic composite of the present invention.

Example 3

The composition for formation of the organic-inorganic composite and the organic-inorganic composite in Example 3 were prepared in the same manner as that of Example 1 except that 94 mg of the surface-treated zirconium oxide particles A and 161 mg of the copolymer A containing the organic ligands were used.

This composition for formation of the organic-inorganic composite was measured by DLS and the dispersed particle diameter of the surface-treated zirconium oxide particles was increased to 23 nm, and when this organic-inorganic composite was measured by FT-IR, the same absorption peaks as those of the organic-inorganic composite in Example 1 were observed. This confirmed the presence of the composition for formation of the organic-inorganic composite and the organic-inorganic composite of the present invention.

Example 4

The composition for formation of the organic-inorganic composite and the organic-inorganic composite in Example 4 were prepared in the same manner as that of Example 1 except that 17 mg of the surface-treated aluminum oxide particles B was used instead of 16 mg of the surface-treated zirconium oxide particles A.

Here, when the copolymer A containing the organic ligands was introduced and stirred, the color of the composition turned yellow from transparent. This visually confirmed that the aluminum oxide particles B and the organic ligand of the copolymer A containing the organic ligands formed the complex.

This organic-inorganic composite was also measured by FT-IR and characteristic absorption peaks representing bidentation coordination of 8-quinolinol to the surface of aluminum oxide were observed at 1579 $cm^{-1}$, 1502 $cm^{-1}$, 1471 $cm^{-1}$, 1385 $cm^{-1}$, 1328 $cm^{-1}$, 1281 $cm^{-1}$, and 1110 $cm^{-1}$. This confirmed the presence of organic-inorganic composite of the present invention.

Example 5

The composition for formation of the organic-inorganic composite and the organic-inorganic composite in Example 5 were prepared in the same manner as that of Example 2 except that 33 mg of the surface-treated aluminum oxide particles B was used instead of 31 mg of the surface-treated zirconium oxide particles A.

Here, when the copolymer A containing the organic ligands was introduced and stirred, the color of the composition turned yellow from transparent. This visually confirmed that the aluminum oxide particles B and the organic ligand of the copolymer A containing the organic ligands formed the complex.

This organic-inorganic composite was also measured by FT-IR and the same absorption peaks as those of the organic-inorganic composite in Example 4 were observed. This confirmed the presence of the composition for formation of the organic-inorganic composite and the organic-inorganic composite of the present invention.

Example 6

The composition for formation of the organic-inorganic composite in Example 6 was prepared by introducing 31 mg of the surface-treated zirconium oxide particles A to 4 mL of ethylene glycol monoethyl ether (ethyl cellosolve), the mixture being stirred, mixed and made to be a transparent dispersion, and then 225 mg of the copolymer B containing the organic ligands being introduced and the mixture being stirred.

When this copolymer B containing the organic ligands was introduced and stirred for 5 hours at room temperature, the color of the composition turned yellow from transparent. This visually confirmed that the zirconium oxide particles A and the organic ligand of the copolymer B containing the organic ligands formed the complex.

The composition was also measured by DLS and the dispersed particle diameter was increased to 12 nm after the copolymer B containing the organic ligands was introduced, compared to the dispersed particle diameter in ethylene glycol monoethyl ether dispersion being 3 nm. Therefore, the presence of the composition for formation of the organic-inorganic composite of the present invention was confirmed from the formation of aggregation of the copolymer B containing the organic ligands and the zirconium oxide particles by the organic ligand of the copolymer B containing the organic ligands being bonded to the zirconium oxide particles through coordinate bonds.

The organic-inorganic composite in Example 6 was prepared by subsequently packing this composition for formation of an organic-inorganic composite in a Teflon container and then drying at 120° C.

This organic-inorganic composite was measured by FT-IR and characteristic absorption peaks representing bidentation coordination of 4-methoxybenzoylmethane to the surface of zirconium oxide were observed at 1590 $cm^{-1}$, 1530 $cm^{-1}$, and 1415 $cm^{-1}$. This confirmed the presence of organic-inorganic composite of the present invention.

Example 7

The composition for formation of the organic-inorganic composite and the organic-inorganic composite in Example 7 were prepared in the same manner as that of Example 6 except that 63 mg of the surface-treated zirconium oxide particles A and 200 mg of the copolymer B containing the organic ligands were used.

This composition for formation of the organic-inorganic composite was measured by DLS and the dispersed particle diameter of the surface-treated zirconium oxide particles was increased to 15 nm, and when this organic-inorganic composite was measured by FT-IR, the same absorption peaks as those of the organic-inorganic composite in Example 6 were observed. This confirmed the presence of the composition for formation of the organic-inorganic composite and the organic-inorganic composite of the present invention.

Example 8

The composition for formation of the organic-inorganic composite in Example 8 was prepared by introducing 31 mg of the surface-treated zirconium oxide particles A to 4 mL of ethylene glycol monoethyl ether (ethyl cellosolve), the mixture being stirred, mixed and made to be a transparent dispersion, and then 225 mg of the copolymer D containing the organic ligands being introduced and the mixture being stirred.

When this copolymer D containing the organic ligands was introduced and stirred, the color of the composition turned orange from yellow. This visually confirmed that the zirconium oxide particles A and the organic ligand of the copolymer D containing the organic ligands formed the complex.

The composition was also measured by dynamic light scattering (DLS) and the dispersed particle diameter was increased to 11 nm after the copolymer D containing the organic ligands was introduced, compared to the dispersed particle diameter in ethylene glycol monoethyl ether dispersion being 3 nm. Therefore, the presence of the composition for formation of the organic-inorganic composite of the present invention was confirmed from the formation of aggregation of the copolymer D containing the organic ligands and the zirconium oxide particles by the organic ligand of the copolymer D containing the organic ligands being bonded to the zirconium oxide particles through coordinate bonds.

The organic-inorganic composite in Example 8 was prepared by subsequently packing this composition for formation of an organic-inorganic composite in a Teflon (registered trademark) container and then drying at 120° C.

Absorbance of this organic-inorganic composite was measured and absorbance in the longer wavelength region was observed compared to the absorbance of diferuloylmethane alone in 480 to 500 nm. This is due to a coordination of diferuloylmethane on the surface of the zirconium oxide, therefore, confirmed the presence of organic-inorganic composite of the present invention.

Example 9

The composition for formation of the organic-inorganic composite in Example 9 was prepared by introducing 31 mg of the surface-treated zirconium oxide particles A to 4 mL of ethylene glycol monoethyl ether (ethyl cellosolve), the mixture being stirred, mixed and made to be a transparent dispersion, and then 225 mg of the copolymer E containing the organic ligands being introduced and the mixture being stirred.

When this copolymer E containing the organic ligands was introduced and stirred, the color of the composition turned orange from yellow. This visually confirmed that the zirconium oxide particles A and the organic ligand of the copolymer E containing the organic ligands formed the complex.

The composition was also measured by dynamic light scattering (DLS) and the dispersed particle diameter was increased to 15 nm after the copolymer E containing the organic ligands was introduced, compared to the dispersed particle diameter in ethylene glycol monoethyl ether dispersion being 3 nm. Therefore, the presence of the composition for formation of the organic-inorganic composite of the present invention was confirmed from the formation of aggregation of the copolymer E containing the organic ligands and the zirconium oxide particles by the organic ligand of the copolymer E containing the organic ligands being bonded to the zirconium oxide particles through coordinate bonds.

The organic-inorganic composite in Example 9 was prepared by subsequently packing this composition for formation of an organic-inorganic composite in a Teflon (registered trademark) container and then drying at 120° C.

Absorbance of this organic-inorganic composite was measured and absorbance in the longer wavelength region was observed, compared to the absorbance of 8-quinolinol alone having a dimethylaminophenyl group in 412 nm. This is due to a coordination of 8-quinolinol having a dimethylaminophenyl group on the surface of the zirconium oxide, therefore, confirmed the presence of organic-inorganic composite of the present invention.

Example 10

Ink composition for printing in Example 10 was prepared by adding 2 mL of α-terpineol to the composition for formation of the organic-inorganic composite of Example 1, further adding ethyl cellulose (100 cP) and adjusting the viscosity to be 20,000 cP. The color of this ink composition for printing was pale yellow, and it was visually confirmed that the zirconium oxide particles A and the organic ligand of the copolymer A containing the organic ligands formed the complex.

A printed film with thickness of 25 μm was prepared by screen printing this ink composition for printing, forming a solid film, and then drying at 120° C.

This printed film was measured by FT-IR and the same absorption peaks as those of the organic-inorganic composite in Example 1 were observed. This confirmed the presence of the ink composition for printing of the present invention.

Example 11

25 mL of ethylene glycol monoethyl ether (ethyl cellosolve), 2.8 g (40 mmol) of acrylamide, 1.0 g (10 mmol) of methyl methacrylate, 0.58 g (2 mmol) of the 5-methyl(2-methacryloylethyloyl)-8-quinolinol (the monomer containing the organic ligands), and 0.085 g (0.52 mmol) of 2,2'-azobisisobutyronitrile were introduced to a 50 mL two-neck eggplant-shaped flask equipped with a stirrer chip, and polymerization reaction was carried out by stirring the mixture at 60° C. for 40 hours under a nitrogen atmosphere.

After the reaction was completed, this reaction solution was cooled to room temperature, poured into hexane, and a copolymer was obtained as a precipitate. After that, the solvent was removed by an evaporator, the precipitate was vacuum-dried, and 3.9 g of the copolymer A' containing the organic ligands was obtained.

Based on GPC measurement, an average molecular weight of this copolymer A' containing the organic ligands was 17,000 in number average molecular weight (Mn) and 36,000 in weight average molecular weight (Mw). Measurement by $^1$H-NMR in deuterated chloroform was also carried out to compare the peak intensities of the protons in the heterocyclic ring of 8-quinolinol with the protons in the amide group in acrylamide and the protons in the methyl group in methyl methacrylate and the result was 1 mol of 5-methyl(2-methacryloylethyloyl)-8-quinolinol with regard to 20 mol of acrylamide and 5 mol of methyl methacrylate.

Therefore, it was confirmed that the copolymer A' containing the organic ligands was formed in the same ratio as the input ratio.

Subsequently, an ink composition for an ink jet in Example 11 was prepared by introducing 16 mg of the surface-treated zirconium oxide particles A to a mixed solution of 2 mL of water, 1 mL of 2-propanol and 1 mL of diethylene glycol, the mixture being stirred, mixed and made to be a transparent dispersion, and then 238 mg of the copolymer A' containing the organic ligands being introduced and the mixture being stirred.

When this copolymer A' containing the organic ligands was introduced and stirred, the color of the ink composition for ink jet turned yellow from transparent. This visually confirmed that the zirconium oxide particles A and the organic ligand of the copolymer A' containing the organic ligands formed the complex.

The composition was also measured by dynamic light scattering (DLS) and the dispersed particle diameter was increased to 18 nm after the copolymer A' containing the organic ligands was introduced, compared to the dispersed particle diameter in ethylene glycol monoethyl ether dispersion being 3 nm. Therefore, the presence of the ink composition for an ink jet of the present invention was confirmed from the formation of aggregation of the copolymer A' containing the organic ligands and the zirconium oxide particles by the organic ligand of the copolymer A' containing the organic ligands being bonded to the zirconium oxide particles through coordinate bonds.

An ink-receptive coating material formed of 90 g of polyvinyl butyral resin S-LEC BX-10 (manufactured by Sekisui Chemical Co., Ltd.) and 10 g of silica-sol was coated and dried using bar coater on a PET film, Lumirror U-94 (manufactured by Toray Industries, Inc.), of A4 size or with film thickness of 125 μm and a transparent substrate having an ink-receiving layer with coated film thickness of 10 μm.

The ink composition for an ink jet was then packed in an ink jet type printer PM-2000C (manufactured by Seiko Epson Corporation) and a printed film with a solid film-like pattern was formed on a transparent film substrate having an ink receiving layer.

This printed film was also measured by FT-IR and the same absorption peaks as those of the organic-inorganic composite in Example 1 were observed. This confirmed the presence of the ink composition for an ink jet of the present invention.

Comparative Example 1

25 mL of toluene, 5.0 g of methyl methacrylate, and 0.080 g of 2,2'-azobisisobutyronitrile were introduced to a 50 mL two-neck eggplant-shaped flask equipped with a stirrer chip, and polymerization reaction was carried out by stirring the mixture at 60° C. for 30 hours under a nitrogen atmosphere. After that, this reaction solution was cooled to room temperature, poured into methanol, and a polymer was obtained as a precipitate. Solvent of the precipitate was subsequently removed by an evaporator, the precipitate was vacuum-dried, and then 4.5 g of the polymer C was prepared. Based on GPC measurement, an average molecular weight of this polymer C was 16,000 in number average molecular weight (Mn) and 39,000 in weight average molecular weight (Mw).

The composition for formation of the organic-inorganic composite in Comparative Example 1 was prepared by introducing 31 mg of the surface-treated zirconium oxide particles A to 4 mL of ethylene glycol monoethyl ether (ethyl cellosolve), the mixture being stirred, mixed and made to be a transparent dispersion, and then 11.4 mg of 8-quinolinol and 214 mg of the polymer C being introduced to this transparent dispersion and the mixture being stirred.

Next, the organic-inorganic composite in Comparative Example 1 was prepared by packing this composition for formation of an organic-inorganic composite in a Teflon container and then drying at 120° C.

In the composition for formation of the organic-inorganic composite, the color of the composition turned yellow from transparent when 8-quinolinol was introduced and stirred, therefore, it was visually confirmed that the zirconium oxide particles A and 8-quinolinol formed the complex, however, when the composition for formation of the organic-inorganic composite was measured by DLS, the dispersed particle diameter of the surface-treated zirconium oxide particles was around 3 nm, therefore, little change was observed.

As a result, it was confirmed that there was no bonding or interaction between 8-quinolinol coordinated on the surface of the zirconium oxide particle and the polymer C and, therefore, there was no bonding or interaction between the organic ligand and the polymer chain of the organic polymer compound, and the organic ligand alone was coordinated on the surface of the zirconium oxide.

Comparative Example 2

The composition for formation of the organic-inorganic composite in Comparative Example 2 was prepared by introducing 31 mg of the surface-treated zirconium oxide particles A to 4 mL of ethylene glycol monoethyl ether (ethyl cellosolve), the mixture being stirred, mixed and made to be a transparent dispersion, and then 20.3 mg of 1,3-bis(4-methoxyphenyl)-1,3-propanedione and 205 mg of the polymer C prepared in Comparative Example 1 being introduced to this transparent dispersion and the mixture being stirred.

Next, the organic-inorganic composite in Comparative Example 2 was prepared by packing this composition for formation of an organic-inorganic composite in a Teflon container and then drying at 120° C.

The color of the composition turned yellow from transparent when 1,3-bis(4-methoxyphenyl)-1,3-propanedione was introduced and stirred, therefore, it was visually confirmed that the zirconium oxide particles A and 1,3-bis(4-methoxyphenyl)-1,3-propanedione formed the complex, however, when the composition for formation of the organic-inorganic composite was measured by DLS, the dispersed particle diameter of the surface-treated zirconium oxide particles was around 3 nm, therefore, little change was observed.

As a result, it was confirmed that there was no bonding or interaction between 1,3-bis(4-methoxyphenyl)-1,3-propanedione coordinated on the surface of the zirconium oxide particle and the polymer C and, therefore, there was no bonding or interaction between the organic ligand and the polymer chain of the organic polymer compound, and the organic ligand alone was coordinated on the surface of the zirconium oxide.

Comparative Example 3

A composition in Comparative Example 3 was prepared by introducing 238 mg of the copolymer A containing the organic ligands to 4 mL of ethylene glycol monoethyl ether (ethyl cellosolve) and stirring the mixture.

A cured product in Comparative Example 3 was subsequently prepared by packing this composition in a Teflon container and then drying at 120° C.

Comparative Example 4

A composition in Comparative Example 4 was prepared by introducing 238 mg of the copolymer B containing the organic ligands to 4 mL of ethylene glycol monoethyl ether (ethyl cellosolve) and stirring the mixture.

A cured product in Comparative Example 4 was subsequently prepared by packing this composition in a Teflon container and then drying at 120° C.

Comparative Example 5

A composition in Comparative Example 5 was prepared by introducing 238 mg of the copolymer C prepared in Comparable Example 1 to 4 mL of ethylene glycol monoethyl ether (ethyl cellosolve) and stirring the mixture.

A cured product in Comparative Example 5 was subsequently prepared by packing this composition in a Teflon container and then drying at 120° C.

Comparative Example 6

A composition in Comparative Example 6 was prepared by introducing 238 mg of the copolymer D containing the organic ligands to 4 mL of ethylene glycol monoethyl ether (ethyl cellosolve) and stirring the mixture.

A cured product in Comparative Example 6 was subsequently prepared by packing this composition in a Teflon (registered trademark) container and then drying at 120° C.

Comparative Example 7

A composition in Comparative Example 7 was prepared by introducing 238 mg of the copolymer E containing the organic ligands to 4 mL of ethylene glycol monoethyl ether (ethyl cellosolve) and stirring the mixture.

A cured product in Comparative Example 7 was subsequently prepared by packing this composition in a Teflon (registered trademark) container and then drying at 120° C.

Comparative Example 8

Ink composition for printing in Comparative Example 8 was prepared by adding 2 mL of α-terpineol to the composition for formation of the organic-inorganic composite of Comparative Example 1, further adding ethyl cellulose (100 cP) and adjusting the viscosity to be 20,000 cP. The color of this ink composition for printing was pale yellow, and it was visually confirmed that the zirconium oxide particles A and 8-quinolinol formed the complex, however, when the ink for printing was measured by transmission electron microscope (TEM), the dispersed particle diameter of the surface-treated zirconium oxide particles was around 3 nm, therefore, little change was observed.

As a result, it was confirmed that there was no bonding or interaction between 8-quinolinol coordinated on the surface of the zirconium oxide particle and the polymer C and, therefore, there was no bonding or interaction between the organic ligand and the polymer chain of the organic polymer compound, and the organic ligand alone was coordinated on the surface of the zirconium oxide.

A printed film with thickness of 25 μm was prepared by screen printing this ink composition for printing, forming a solid film, and then drying at 120° C.

[Evaluation]

For each organic-inorganic composite of Examples 1 to 9 and Comparative Examples 1 and 2, and each cured product of Comparative Examples 3 to 7, visible light transmittance, absorbance, maximum value of light emission wavelength, stability of light emission wavelength, glass transition temperature, temperature of 10% mass loss and pencil hardness were evaluated by following methods.

(1) Visible Light Transmittance

Visible light transmittance was measured in the wavelength range of 350 nm to 800 nm using a spectrophotometer V-570 (manufactured by JASCO Corporation).

Here, the organic-inorganic composites and the cured products were made as films with a thickness of approximately 20 μm and visible light transmittance was measured with transmittance of quartz substrate set as 100%.

For the evaluation, if the visible light transmittance was 85% or more, it was determined to be "O", and if less than 85%, it was determined to be "X".

(2) Absorbance

For each composition for formation of the organic-inorganic composite of Examples 1 to 9 and Comparative Examples 1 and 2, and each composition of Comparative Examples 3 to 7, UV-visible absorption spectrum was measured using a UV-visible spectrophotometer (manufactured by Shimadzu Corporation) and absorption wavelength (nm) was determined from this UV-visible absorption spectrum.

(3) Maximum Value of Light Emission Wavelength

Each composition for formation of the organic-inorganic composite of Examples 1 to 9 and Comparative Examples 1 and 2, and each cured product of Comparative Examples 3 to 7, was excited to the wavelength at which absorption was observed in UV-visible absorption spectrum, and the maximum value of light emission wavelength was measured using a fluorescence spectrophotometer (manufactured by Horiba, Ltd.).

(4) Stability of Light Emission Wavelength

For each composition for formation of the organic-inorganic composite of Examples 1 to 9 and Comparative Examples 1 and 2, and each cured product of Comparative Examples 3 to 7, the maximum value of light emission wavelength was measured immediately after preparation and one week after preparation, respectively, using a fluorescence spectrophotometer (manufactured by Horiba, Ltd.) and stability of light emission wavelength was evaluated.

Here, if the maximum value of light emission wavelength decrease after one week from preparation was less than 20% with regard to the maximum value of light emission wavelength immediately after preparation, it was determined to be "O" and if 20% or more, it was determined to be "X".

(5) Glass Transition Temperature

For each composition for formation of the organic-inorganic composite of Examples 1 to 9 and Comparative Examples 1 and 2, and each cured product of Comparative Examples 3 to 7, a glass transition temperature was measured with the temperature elevation condition of 5° C./min under a nitrogen gas flow using a differential scanning calorimeter (manufactured by Seiko Instruments, Inc.).

(6) Temperature of 10% Mass Loss

For each composition for formation of the organic-inorganic composite of Examples 1 to 9 and Comparative Examples 1 and 2, and each cured product of Comparative Examples 3 to 7, temperature of 10% mass loss was measured with the temperature elevation condition of 10° C./min under an air flow using a thermogravimetric measuring device (manufactured by Seiko Instruments, Inc.).

(7) Pencil Hardness

Each composition for formation of the organic-inorganic composite of Examples 1 to 9 and Comparative Examples 1 and 2, and each cured product of Comparative Examples 3 to 7 was measured in accordance with Japanese Industrial Standard JIS K 5400.

These results are shown in Table 1 and Table 2.

Figure 7:
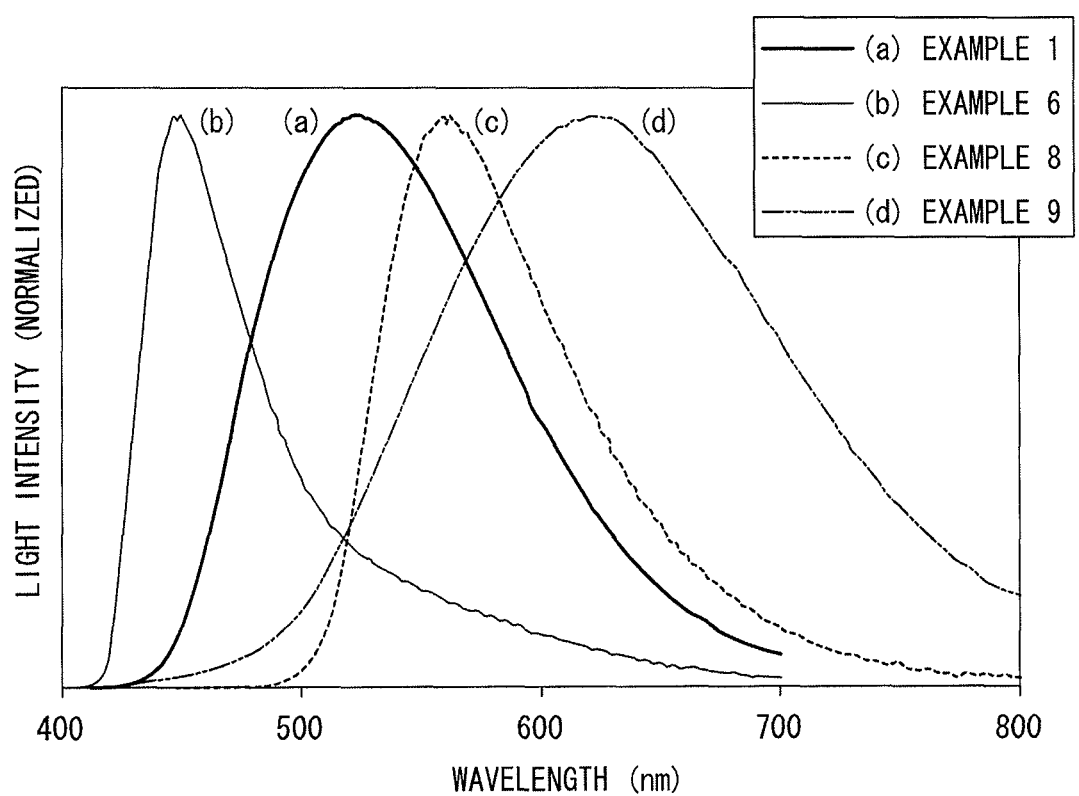
FIG. 7 is a diagram which shows each light emission spectra of Examples 1, 6, 8, and 9 of the present invention.

In addition, each light emission spectrum of Examples 1, 6, 8, and 9 is shown in FIG. 7.

TABLE 1

| | Metal Oxide Particle | Organic Compound | Visible Light Transmittance (%) | Absorbance (nm) | Maximum Value of Light Emission Wavelength (nm) | Stability | Glass Transition Temperature (° C.) | Temp. of 10% Weight Loss (° C.) | Pencil Hardness |
|---|---|---|---|---|---|---|---|---|---|
| Example 1 | Zirconium Oxide | Copolymer A | ○ | 325, 384 | 533 | ○ | 108 | 305 | 2H |
| Example 2 | Zirconium Oxide | Copolymer A | ○ | 325, 385 | 534 | ○ | 111 | 310 | 3H |
| Example 3 | Zirconium Oxide | Copolymer A | ○ | 325, 385 | 534 | ○ | 125 | 323 | 4H |
| Example 4 | Zirconium Oxide | Copolymer A | ○ | 310, 368 | 519 | ○ | 110 | 311 | 2H |
| Example 5 | Zirconium Oxide | Copolymer A | ○ | 310, 368 | 520 | ○ | 118 | 320 | 3H |
| Example 6 | Zirconium Oxide | Copolymer B | ○ | 291, 364, 379 | 463 | ○ | 108 | 296 | 2H |
| Example 7 | Zirconium Oxide | Copolymer B | ○ | 291, 364, 379 | 463 | ○ | 110 | 304 | 3H |
| Example 8 | Zirconium Oxide | Copolymer D | ○ | 265, 429 | 562 | ○ | 115 | 307 | 3H |
| Example 9 | Zirconium Oxide | Copolymer E | ○ | 297, 412 | 623 | ○ | 116 | 318 | 3H |
| Comp. Ex. 1 | Zirconium Oxide | Polymer C + 8-quinolinol | X | 319, 383 | 543 | X | 102 | 300 | 2H |
| Comp. Ex. 2 | Zirconium Oxide | Polymer C + 1,3-bis(4-methoxyphenyl)-1,3-propanedione | X | 293, 365, 380 | 452 | X | 95 | 288 | 2H |
| Comp. Ex. 3 | None | Copolymer A | ○ | — | — | — | 105 | 304 | 1H |
| Comp. Ex. 4 | None | Copolymer B | ○ | — | — | — | 95 | 291 | 1H |
| Comp. Ex. 5 | None | Polymer C | ○ | — | — | — | 91.3 | 241 | 1H |
| Comp. Ex. 6 | None | Polymer D | ○ | — | — | — | 100 | 298 | 1H |
| Comp. Ex. 7 | None | Polymer E | ○ | — | — | — | 105 | 305 | 1H |

As shown in Table 1, the organic-inorganic composites of Examples 1 to 9 were all excellent in visible light transmittance, stability of light emission wavelength, and pencil hardness, and were excellent in light emission characteristics and transparency as well, therefore, mechanical characteristics was also improved, compared to the organic-inorganic composites of Comparative Examples 1 and 2 and cured products of Comparative Examples 3 to 7. Therefore, a homogeneous composite which maintains transparency could be provided.

On the other hand, in the organic-inorganic composites of Comparative Examples 1 and 2, it was not possible to obtain transparent composites due to aggregation of the zirconia particles which formed the complex. The composite also had low resistance to light or heat and fluorescence intensity was significantly reduced during elapse of time since the organic ligand was not bonded to the polymer. Furthermore, the cured products of Comparative Examples 3 to 7 had poor mechanical characteristics and thermal characteristics since metal oxide particles were not included.

excellent in visible light transmittance and stability of light emission wavelength, and therefore, light emission characteristics and transparency were improved, compared to the ink for printing of Comparative Example 8. Therefore, it was confirmed that a homogeneous composite which maintains transparency could be provided.

On the other hand, in the ink for printing of Comparative Example 8, it was not possible to obtain transparent printed film due to aggregation of the zirconia particles which formed the complex. The printed film also had low resistance to light or heat and fluorescence intensity was significantly reduced during elapse of time since the organic ligand was not bonded to the polymer.

INDUSTRIAL APPLICABILITY

The organic-inorganic composite of the present invention can be applied to various light emitting elements or members in which high precision and reliability are required such as a light emitting device using a light emitting element, a

TABLE 2

| | Type of Ink | Metal Oxide Particle | Organic Compound | Visible Transmittance (%) | Absorbance (nm) | Maximum Value of Light Emission Wavelength (nm) | Stability |
|---|---|---|---|---|---|---|---|
| Example 10 | Ink for Printing | Zirconium Oxide | Copolymer A | ○ | 325, 385 | 534 | ○ |
| Example 11 | Ink for Ink jet | Zirconium Oxide | Copolymer A' | ○ | 325, 385 | 534 | ○ |
| Comparative Example 8 | Ink for Printing | Zirconium Oxide | Copolymer A | X | 320, 384 | 543 | X |

As shown in Table 2, the ink for printing and the ink for an ink jet of Comparative Examples 10 and 11 were all light emitting element of an organic EL device and a display, an optical information recording medium such as an optical film, a MO, a CD, and a DVD, anti-counterfeiting ink, fluorescent ink for marking, fluorescent ink for a bar code, ink for printing, and ink for an ink jet since the organic ligand of the organic polymer compound forms the complex with the metal atoms on the surface of the metal oxide particles, therefore, light emission characteristics such as light emission intensity or stabilization of light emission wavelength can be improved, and since the organic polymer compound is prepared by forming an inorganic dispersed phase crosslinked by the metal oxide particles, and therefore, transparency and mechanical characteristics such as thermal stability or hardness can be improved.

REFERENCE SIGNS LIST 1,1' organic-inorganic composite
2 metal oxide particle
3 organic polymer compound
3' bulk-shaped organic polymer compound
4 polymer chain
4a monomer containing organic ligands
4b vinyl-based monomer
5 oOrganic ligand
6 complex

We claim:

1. An organic-inorganic composite, including:
   metal oxide particles and an organic polymer compound containing organic ligands which are bonded to a polymer chain through covalent bonds,
   wherein the organic polymer compound is bonded to the metal oxide particles by the organic ligands forming a complex with metal atoms on the surface of the metal oxide particles,
   the organic ligand comprises a cyclic structure having a conjugated system or a plurality of unsaturated bonds, and
   the cyclic structure is unified with moieties comprising an element having a lone pair of electrons, an oxygen atom, and a metal atom that is coordinated to both the lone pair of electrons and the oxygen atom, to form a unified cyclic complex.

2. The organic-inorganic composite according to claim 1, wherein light is emitted by being irradiated with excitation light.

3. The organic-inorganic composite according to claim 1, wherein the organic polymer compound forms an inorganic dispersed phase which is crosslinked by the metal oxide particles.

4. The organic-inorganic composite according to claim 2, wherein the complex formed from the organic ligands and the metal atoms is a light emission site which generates the light emission.

5. The organic-inorganic composite according to claim 1, wherein the metal oxide particle contains at least one element selected from the group consisting of magnesium oxide, calcium oxide, strontium oxide, barium oxide, scandium oxide, yttrium oxide, lanthanum oxide, titanium oxide, zirconium oxide, hafnium oxide, zinc oxide, aluminum oxide, gallium oxide, indium oxide, iron oxide, copper oxide, niobium oxide, tungsten oxide, lead oxide, bismuth oxide, cerium oxide, and antimony oxide.

6. The organic-inorganic composite according to claim 1, wherein the organic polymer compound is a copolymer of a monomer containing organic ligands including an unsaturated group and the organic ligand which is capable of forming coordinate bonds to the metal atoms within the molecule and a vinyl-based monomer.

7. A composition for formation of an organic-inorganic composite, including:
   metal oxide particles;
   an organic polymer compound containing organic ligands which are bonded to a polymer chain through covalent bonds and are capable of forming coordinate bonds to metal atoms on the surface of the metal oxide particles, or a monomer or an oligomer for forming the organic polymer compound containing the organic ligands,
   the organic ligand comprises a cyclic structure having a conjugated system or a plurality of unsaturated bonds, and
   the cyclic structure is unified with moieties comprising an element having a lone pair of electrons, an oxygen atom, and a metal atom that is coordinated to both the lone pair of electrons and the oxygen atom, to form a unified cyclic complex.

8. The composition for formation of an organic-inorganic composite according to claim 7, further including an organic solvent.

9. The organic-inorganic composite according to claim 2, wherein the light emission is any one of blue light emission, green light emission, yellow light emission, and red light emission.

10. An ink including:
    metal oxide particles;
    an organic polymer compound containing organic ligands which are bonded to a polymer chain through covalent bonds and are capable of forming coordinate bonds to metal atoms on the surface of the metal oxide particles, or a monomer or an oligomer for forming the organic polymer compound containing the organic ligands; and
    an organic solvent,
    the organic ligand comprises a cyclic structure having a conjugated system or a plurality of unsaturated bonds, and
    the cyclic structure is unified with moieties comprising an element having a lone pair of electrons, an oxygen atom, and a metal atom that is coordinated to both the lone pair of electrons and the oxygen atom, to form a unified cyclic complex.

* * * * *